(12) United States Patent
Omari et al.

(10) Patent No.: US 11,548,518 B2
(45) Date of Patent: Jan. 10, 2023

(54) SUBJECTIVE ROUTE COMFORT MODELING AND PREDICTION

(71) Applicant: Woven Planet North America, Inc., Los Altos, CA (US)

(72) Inventors: Sammy Omari, Menlo Park, CA (US); Emil Praun, Union City, CA (US); Sameer Qureshi, Sunnyvale, CA (US); Matt Vitelli, San Francisco, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 158 days.

(21) Appl. No.: 16/457,678

(22) Filed: Jun. 28, 2019

(65) Prior Publication Data

US 2020/0406906 A1 Dec. 31, 2020

(51) Int. Cl.
*B60W 50/00* (2006.01)
*G05D 1/02* (2020.01)
*G05D 1/00* (2006.01)

(52) U.S. Cl.
CPC .... *B60W 50/0098* (2013.01); *B60W 50/0097* (2013.01); *G05D 1/0221* (2013.01); *G05D 1/0223* (2013.01); *B60W 2540/22* (2013.01); *G05D 1/0088* (2013.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 2017/0174221 | A1* | 6/2017 | Vaughn | G05D 1/021 |
| 2018/0208209 | A1* | 7/2018 | Al-Dahle | B60W 10/22 |
| 2019/0276036 | A1* | 9/2019 | Noguchi | B60W 30/18 |
| 2019/0329790 | A1* | 10/2019 | Nandakumar | G06N 3/084 |
| 2020/0079396 | A1* | 3/2020 | Beaurepaire | B60W 40/09 |
| 2020/0130703 | A1* | 4/2020 | Pendelton | G06K 9/00302 |
| 2020/0225676 | A1* | 7/2020 | Telpaz | B60W 50/00 |

* cited by examiner

*Primary Examiner* — Anne Marie Antonucci
*Assistant Examiner* — Amelia Vorce
(74) *Attorney, Agent, or Firm* — Christopher G. Darrow; Darrow Mustafa PC

(57) ABSTRACT

In one embodiment, a method by a computing system of a vehicle includes determining an environment of the vehicle. The method includes generating, based on the environment, multiple proposed vehicle actions with associated operational data. The method includes determining a comfort level for each proposed vehicle action by processing the environment and operational data using a model for predicting comfort levels of vehicle actions. The model is trained using records of performed vehicle actions. The record for each performed vehicle action includes environment data, operational data, and a perceived passenger comfort level for the performed vehicle action. The method includes selecting a vehicle action from the proposed vehicle actions based on the determined comfort level. The method includes causing the vehicle to perform the selected vehicle action.

20 Claims, 9 Drawing Sheets

SUBJECTIVE ROUTE COMFORT MODELING AND PREDICTION

BACKGROUND

As autonomous or semi-autonomous vehicles travel through an environment, they must react to a wide variety of situations, many of which may be entirely novel to the vehicle. The vehicle cannot rely purely on reacting to future events in the same manner it did in previous situations because of the dynamic nature of driving in nearly all environments. Autonomous and semi-autonomous vehicles, therefore, may need to be capable of interpreting incomplete past data and using that data to make moment-to-moment operational decisions. Those decisions are often based on a set of guidelines that serve as the rules for handling new experiences. As an example, a rule may be to avoid traveling over the speed limit or to avoid collisions with objects in the environment.

Other rules created for autonomously operating vehicles may address more detailed questions such as the rate of acceleration or the rate or length of braking forces that can affect the experience of a passenger in a vehicle. A vehicle that accelerates too quickly may leave passengers of the vehicle feeling unsafe or uncomfortable. However, these types of detailed rules are most often decided based on the experiences of the persons responsible for designing the autonomous or semi-autonomous vehicle and the models underlying its decisional capabilities. Thus, the opinions of a small number of persons may dictate the elements of vehicle operation that determine the overall comfort level of passengers riding in the vehicle. Because ride comfort is a particularly subjective question—each driver and passenger may have their own subtle preferences for details such as how quickly a vehicle should perform certain operations— the centralized approach to creating vehicle operational decisions may create uncomfortable rides for many passengers. Furthermore, because of the subjective nature of ride comfort, current systems lack the ability to account for individual preferences of passengers in vehicle operation.

DESCRIPTION OF EXAMPLE EMBODIMENTS

Figure 1:
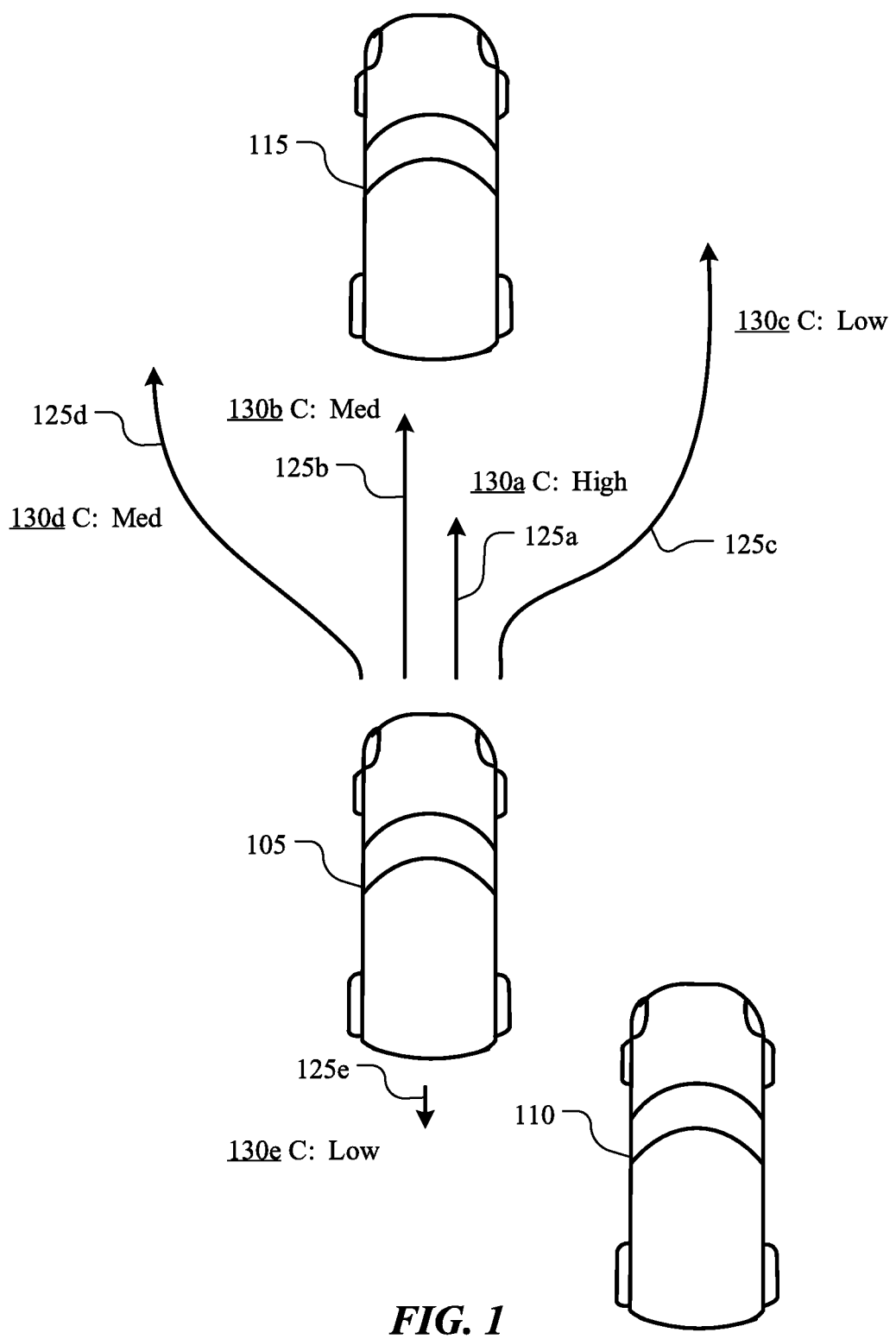
FIG. 1 illustrates a vehicle in a vehicle action scenario.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

An autonomous or semi-autonomous vehicle, or a vehicle management system associated with the vehicle, may include several sub-systems related to determining the response of the vehicle in a given operating scenario. In particular embodiments, an autonomous vehicle may be a transportation vehicle, such as an automobile, truck, bus, or any other suitable vehicle used by persons in transportation. An autonomous vehicle may include a semi-autonomous vehicle, where the vehicle is capable of performing certain maneuvers autonomously but is also capable of being operating manually. Throughout this disclosure, the term autonomous vehicle is used to refer to any vehicle that is operating in an autonomous mode. Operating scenarios may include situations encountered while operating on the road. For example, an autonomous vehicle may be travelling in an urban environment. Through sensors coupled to the autonomous vehicle, the autonomous vehicle may detect one or more pedestrians walking on a sidewalk that may appear to be attempting to cross the street. The autonomous vehicle may have many plausible responses to such a scenario. For example, the autonomous vehicle may continue travelling at the same speed, effectively ignoring the pedestrians. The autonomous vehicle may swerve to avoid the pedestrians. The autonomous vehicle may stop suddenly, allowing the passengers to cross if that was their intention. Many other valid responsive actions may be considered.

FIG. 1 illustrates a vehicle 105 in a scenario requiring a vehicle action. The vehicle 105 may be moving slowly in traffic. In front of the vehicle 105 is a vehicle 115. Another vehicle 110 near the rear bumper of the vehicle 105 is on the right side. The vehicle 105 may be an autonomous vehicle, or a vehicle operating in an autonomous mode. During operation, the vehicle 105, or a vehicle management system associated with the vehicle, may generate and consider several proposed actions that are potential responses to the environment around the vehicle 105. The proposed actions 125a-125e may include different trajectories or paths, speeds while following that path, speed of response (e.g., how quickly the trajectory is taken), a measure of aggressiveness exhibited during the response, and a variety of other suitable variables. The proposed actions 125a-125e may include simply continuing forward at a first, slower speed (e.g., action 125a, or continuing forward at a second, faster speed 125b. The proposed actions may include quickly steering the vehicle into a potentially occupied lane (e.g., action 125c) or steering the vehicle into an unoccupied lane (e.g., action 125d). The proposed actions may include an action such as a complete change in direction (e.g., action 125e). While some of these actions may appear to be inherently preferable to others (e.g., backing up suddenly will likely not be preferred by any passenger), the difference in preference between others may required subjective determinations. As each passenger preference may differ depending on the individual or group in a vehicle, choosing the optimal action is a difficult task.

To determine which action of a multitude of potential vehicle actions an autonomous or semi-autonomous vehicle should take, there are many factors and sub-factors that may be considered. A first factor may be the impact of a vehicle action on actors and objects in the environment of the vehicle at the time the vehicle action is taken. Without limitation, this may include consideration of passenger(s), pedestrians, persons in other vehicles, animals, or property in the environment around the vehicle at the time of a vehicle action. Another factor may be the legality of any possible actions. For example, a vehicle, when determining what to do as it is approaching a traffic light, may take into considering the likelihood that a yellow light will turn red before the vehicle crosses the intersection, how close a trailing vehicle is to the vehicle, the current speed of the vehicle, etc. These factors may affect whether the vehicle accelerates, maintains speed, or brakes.

Another factor may be the comfort of passengers of the vehicle when the vehicle action is performed. For example, even in the routine act of approaching a stop sign, an autonomous vehicle may plausibly engage a wide range of responses. The autonomous vehicle may brake early while approaching and ease up to the sign while taking more time. The autonomous vehicle may brake relatively late, coming up to the stop sign quickly, but causing a relatively hard or sudden stop. The comfort of a passenger may determine whether an autonomous vehicle attempts to overtake a slower-moving vehicle, the speed at which it takes a turn, and many other actions that may occur during operation. In particular embodiments, the behavior of an autonomous vehicle may be examined as occurring over a range of time-scales. The actions may be considered on a moment-to-moment basis—for example, whether to brake or swerve when an unexpected object appears on the road. The actions may be considered on a longer time-scale, such as over the course of a few minutes or an entire trip—for example, the average speed of the vehicle while travelling. Decisions made regarding longer-term behavior may influence moment-to-moment decisions—for example, whether to accelerate or brake while approaching a yellow light may be affected by a passenger preference for arriving early.

While some of the factors an autonomous vehicle control system may consider are objective and can be prohibited—for example, running a stop sign will be illegal in nearly all instances—many are subjective. For example, what constitutes braking too aggressively may be dictated by idiosyncratic preferences. In some cases, only a few bad experiences as a passenger of a vehicle may greatly diminish the passenger's perceived quality or comfort of experience. As a further complication, there may be multiple passengers in a given vehicle. Each passenger of the vehicle may have slightly varied preferences for how a particular scenario should be handled. Previously, the details of the approach to particular driving scenarios taken by autonomous or semi-autonomous vehicles was almost entirely based on the subjective opinions of the limited number of individuals who are responsible for creating and testing the models used by autonomous vehicles in operation. Thus, a small sample size of potential users may be responsible for projecting a so-called optimal response in fundamentally subjective areas of vehicle operation for a large number of passengers.

In particular embodiments, and as described herein, a predictive model may be generated for predicting the subjective experience (e.g., comfort level) of a particular vehicle action. The predictive model may be used when planning a response to a given scenario to quickly and accurately consider the expected perceived comfort level of a passenger of the vehicle. The model may be generated or trained using records of past vehicle actions and evaluations of the vehicle action from passengers of the vehicle or other vehicles in the same vehicle fleet. The records of past vehicle actions may include recording of perceived comfort level for a variety of vehicle actions. The records may further include a range of inputs, including, by way of example, data regarding an environment of a vehicle that performed the vehicle action, operational data of the vehicle, and a perceived comfort level for the vehicle action provided by a passenger of the vehicle while the vehicle performed the vehicle action. The model may be constructed such that it may receive input describing an operating scenario and a proposed vehicle action and it may output a predicted perceived comfort level for passengers of the vehicle. The predicted comfort level may be used when determining which vehicle action to provide to the vehicle. The model may also be constructed to consider a profile or identity of the actual passengers of the vehicle and select an action based on the predicted comfort level that those individual passengers will likely perceive.

Returning to the example illustrated in FIG. 1, the vehicle 105 may have generated a predicted comfort level 130a-130e of a passenger of the vehicle 105 for each of the proposed actions 125a-125e. Although not illustrated, a variety of other predicted variables may be considered for each of the proposed actions 125a-125e, including, but not limited to, elegance, experience, time, cost (in the case of a for-hire vehicle), or fuel consumption. The vehicle 105 may use these variables, among other considerations, when determine the optimal vehicle action to take. For example, for the proposed action 125a (continuing forward at a slower rate), the vehicle 105 may have generated a high predicted comfort level. For the proposed action 125b (continuing forward at an accelerated rate), the vehicle 105 may have generated a medium predicted comfort level 130b. For the proposed action 125c (quickly veering into the occupied lane to the right), the vehicle 105 may have generated a low predicted comfort level 130c. For the proposed action 125d (veering into the unoccupied lane to the right), the vehicle 105 may have generated a medium predicted comfort level 130d. Finally, for the proposed action 125e, the vehicle 105 may have generated a low predicted comfort level 130e. To determine which of the proposed actions to take, the vehicle 105 may determine whether particular actions should be ruled out as unsafe, for example proposed action 125e. In particular embodiments, the vehicle 105 may only generate and consider safe actions. The vehicle 105 may then determine which vehicle actions should be ruled out because they fail to satisfy a comfort threshold. For example, the vehicle 105 may rule out proposed action 125c as being likely too uncomfortable for the passenger. The vehicle 105 may compare the vehicle actions to determine an optimal proposed action. For example, the vehicle may select proposed vehicle action 125a for having a high comfort rating. The vehicle 105 may consider other factors, such as an estimated time to destination, or a passenger urgency to override considerations for comfort and choose another action (e.g., action 125d) with a lower predicted comfort 130d. The comfort levels 130a-130e illustrated for the proposed vehicle actions 125a-125e are presented as a qualitative rating (e.g., low, medium, high) for illustrative purposes only. In various embodiments, the comfort levels may be presented or interpreted by the vehicle along one or more numerical scales, as one or more continuous variables along a scale, or in any other suitable format.

Figure 2:
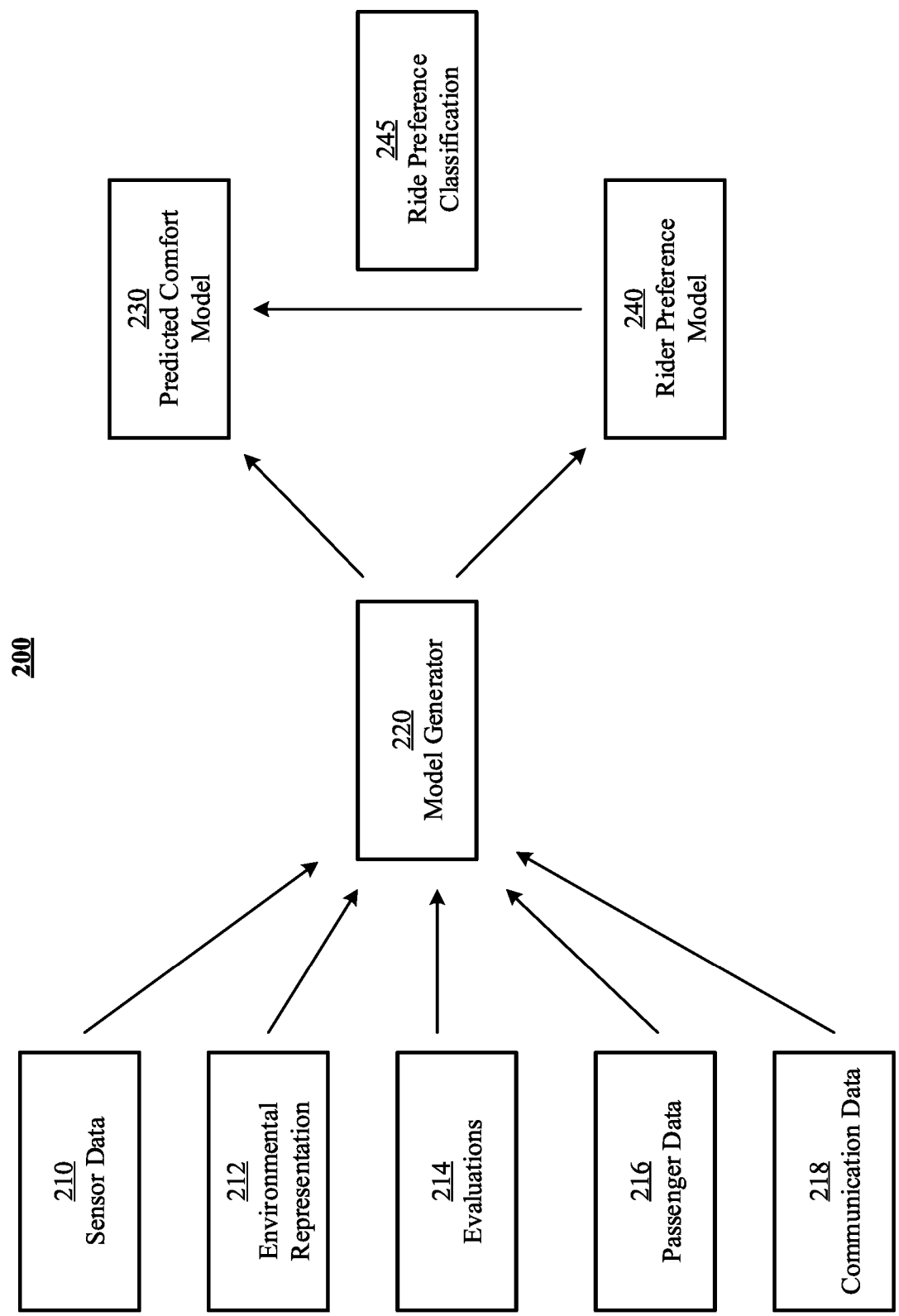
FIG. 2 illustrates an example of a data model for predicting subjective route comfort.

FIG. 2 illustrates a data model 200 for a model generating system that may be used by an autonomous or semi-autonomous vehicle or an autonomous vehicle management system. In particular embodiments, a model generator system 220 may receive a variety of input data. The data may be stored in any suitable fashion such that it is accessible for use by the model generator system 220. In particular embodiments, the data may be stored as a plurality of records that comprise the data organized based around the vehicle action performed. The data may also be organized based around the particular scenario encountered, information regarding the passenger or passengers of the vehicle, or any other suitable variable. The data may comprise operational data for the vehicle and describe the scenario in which a vehicle action is performed. In particular embodiments, the stored data may be modified over time as additional vehicle action data is collected during vehicle operations or testing. In particular embodiments, the model generator system may operate within a vehicle, a base station in an environment of the vehicle, or within an autonomous vehicle control system or transportation management system generally associated with a fleet of vehicles.

A model generator system 220 may receive sensor data 210 from one or more sensors of the vehicle in the time around the vehicle action. The sensor data may include sensor data 210 from before, during, or after a vehicle action. A vehicle may be associated with one or more sensors that may provide objective data about the operation of the vehicle at any given time. The sensors may include sensors related to a vehicle's kinematic properties, such as speed, acceleration, jerk, etc. The sensors may include sensors related to a vehicle operational status, such as throttle position, brake position, tire pressure, fuel level (e.g., level of gasoline, diesel, battery), etc. The sensors may include sensors that output information about the environment of the vehicle. This may include sensors for temperature, humidity, visibility, road condition, traction, distance to objects (e.g., other vehicles, pedestrians, edges of the road, other objects). The sensors may include sensors to measure cabin conditions, such as the number, approximate weight, age, or status of passengers, whether one or more windows are open, etc. The sensor data may come from any other suitable sensors.

In addition to the sensor data 210, a model generator system 220 may receive an environmental representation 212 of the environment around the vehicle. The environmental representation 212 may include information about the environment around the vehicle from before, during, or after the vehicle action. The environmental representation 212 may provide a holistic picture of the vehicle scenario in a manner that cannot be easily represented using sensor output alone. In particular embodiments, an environmental representation 212 may include a standardized format to represent, for example, the presence and identity of other vehicles, persons, or other objects (referred to as the objects in the environment, for simplicity) around the vehicle. The environmental representation 212 may include a path over time of each of the detected objects in the environment. Where the objects have a special meaning, the state of the objects may be noted. For example, a parked vehicle may be noted as being different from a moving vehicle traveling in the same direction as the vehicle. As another example, a status of a traffic light (e.g., green, yellow, red, solid, flashing, off) may be noted. The environmental representation 212 may include any other relevant information that may be encoded into a representation (e.g., semantic map information, etc.). The environmental representation 212 may be stored or presented in machine-readable or human-readable formats, including graphs, images, markup, annotations, any combination thereof, or any other suitable format. The environmental representation 212 may be used in part by the model generator system 220 to generate or train, e.g., a model 230 for predicting perceived comfort of a vehicle action or a model 240 for predicting or inferring rider preferences. Depending on the type and application of the algorithms used to generate or train the models, the environmental representation 212 may be more or less structured to facilitate the operation of the algorithm(s).

The model generator system 220 may receive one or more evaluations 214 of each vehicle action. In particular embodiments, passengers of a vehicle may be afforded the opportunity to provide feedback about the quality or comfort of their experience while riding in a vehicle. The feedback may be directed to the whole ride (e.g., their time in the vehicle from a first destination to one or more second destinations) or to discrete segments of the ride. In particular embodiments, a vehicle, vehicle management system, or transportation management system may recognize scenarios or maneuvers that occurred during a ride and may specifically solicit feedback for those sections of the ride in order to receive evaluations of the vehicle action taken by the vehicle in the scenario. The feedback requested may include feedback regarding perceived safety or level of comfort. The evaluations from the passengers may be provided to the model generator system 220. In some embodiments, the passenger or passengers may be provided the opportunity to respond to scenarios that have occurred during their travel while they are still riding in the vehicle. As an example, after the completion of a trip, a passenger of a vehicle may be contacted via a native application (e.g., through a push notification or other message) or a messaging platform (e.g., a short-message service message or email) with a request to submit an evaluation of the ride. In some embodiments, the passenger may be shown a timeline of the ride with several particular times of interest that relate to vehicle response scenarios. The passenger may receive detailed information about the times of interest (e.g., summarized data from sensors, images of the environment, or an environmental representation) to remind them of the context of the scenario. The passenger may be able to provide an evaluation of the vehicle action. For example, the passenger may be asked to rate their comfort during the scenario and may be given a working scale (e.g., positive or negative, a five-point scale, etc.). The passenger may also be able to leave detailed feedback in the form of written commentary. Similarly, the passenger may be asked to rate their perceived level of comfort, whether the response of the vehicle was what they would have done or would have expected another driver to do, or provide other feedback related to any particular vehicle action, trajectory, or maneuver. The evaluation may be associated with and stored in conjunction with the vehicle action to be used by the model generator system 220.

In particular embodiments, the model generator system 220 may receive information about the passenger or passengers of the vehicle. This passenger data 216 may be used to provide additional context for the received evaluations 214. In particular embodiments, the passenger data 216 may provide a unique identifier for the passenger to track their engagement with the vehicle or the vehicle management system. The passenger data 216 may include a vehicle action intensity preference that relates to the passenger's typical preferred response to a vehicle action. For example, a passenger may indicate that they prefer a more conservative or a more aggressive response to situations they encounter while riding in the vehicle. In particular embodiments, the vehicle action intensity preference may be more granular, presenting preferred response tactics to individual scenarios. For example, a passenger may say that prefer a more conservative, slower approach to a stop sign, and that they also prefer that the vehicle accelerate more aggressively after coming to a complete stop. The passenger data that comprises a vehicle action intensity preference may be used by the model generator system 220 to weight the evaluations from a passenger. For example, an "aggressive" rider may find a vehicle action too conservative, while a "conservative" rider may find the same response too aggressive. Each passenger may indicate as much in their evaluations. By weighing the evaluations using the vehicle action intensity preference, the model generator system 220 may be able to more accurately predict the perceived comfort level of the average passenger.

In particular embodiments, the passenger data 216 may comprise other information that may be used by the model generator system 220 as well. The passenger data 216 may include anonymized passenger demographic data, such as age or gender, familiarity with driving or riding in vehicles (including autonomous or semi-autonomous vehicles), familiarity with the environment of the trip or vehicle action, or any other suitable additional passenger data 216. The information maybe used by the model generator system 220 to more accurately model a vehicle action and the perceived comfort level that would be experienced by the average passenger. In particular embodiments, the information may also be used to create models for passenger archetypes (e.g., conservative, aggressive, passive) to associate with users who have not provided an express vehicle action intensity preference.

In particular embodiments, the model generator system 220 may receive communication data 218 associated with the vehicle. The communication data 218 may reflect communications associated with the vehicle before, during, or after the vehicle action. The communication data may include a communication status, e.g., whether or not the vehicle was able to communicate with other vehicles, persons or objects in the environment, or with a vehicle management system. The communication data may include a content of the communications sent and/or received by the vehicle. This data may be used to determine if there was an error caused by transmission. In the case of human-operated (e.g., non-autonomous) vehicles, the communication data may be used in part to determine if the vehicle action was caused by or was in response to an operator of the vehicle being distracted while operating the vehicle.

The data used by the model generator system 220 may be based on a single passenger of a vehicle or a group of passengers of the vehicle. The data used may further be based on information from a wide variety of users of a transportation system. By using the wide collection of data, models may be generated that are more representative of the median or average passenger. Although this disclosure describes specific types of input data that may be used by a model generator system 220, these are meant as examples only and are not limiting. A model generator system 220 may consider any combination or variation of the data types described, as well as any other suitable data that may be used by a model generator system 220 for generating a model for predicting perceived vehicle action comfort or rider preferences for vehicle actions.

The input data may be used by the model generator system 220 to generate one or more predictive models. In particular embodiments, the model generator system 220 may be a sub-system operating directly on a vehicle. In particular embodiments, the model generator system 220 may be a sub-system of a vehicle management system that is involved with the communication and/or control of an autonomous vehicle. In particular embodiments, the model generator system 220 may be system or sub-system of a transportation management system that controls the operations of several autonomously operating vehicles. In particular embodiments, the model generator system 220 may comprise sub-systems of one or more vehicles and the vehicle management system or transportation management system working in concert to generate the appropriate models for the vehicle. In some embodiments, a model may be generated for each particular vehicle of a vehicle fleet. In some embodiments, a model may be generated based on a variety of similarities between one or more vehicles. For example, models may be generated for one or more vehicles based on the vehicles having a similar make, model, manufacturer, year, miles driven, time operated, location(s) of use, time since maintenance, maintenance history, evaluation history, type (e.g., sedan, convertible, pick-up truck, SUV, ATV, etc.), classification (e.g., autonomous, non-autonomous, virtual, etc.), or any other suitable similarities.

In particular embodiments, the model generator system 220 may generate a predicted comfort model 230 for predicting perceived comfort for a given vehicle action to be performed by an autonomous vehicle. For example, based on the received input, the predicted comfort model 230 may provide a predicted comfort rating for a proposed vehicle action based on the average, or median, passenger that has submitted an evaluation. The model generator system 220 may train the model 230 using a machine-learning procedure. The model may be used by an autonomous vehicle to evaluate possible vehicle actions while selecting which action of a plurality of proposed actions to perform. In use, the predicted comfort model 230 may receive as input information such as an urgency of the vehicle response, information describing the scenario and environment of a vehicle, and one or more possible vehicle actions. For example, the predicted comfort model may be used to score a variety of different proposed trajectories to determine and select the proposed trajectory that has a highest comfort or elegance score for human passengers overall, the subset of passengers currently in the vehicle, or a specific passenger currently in the vehicle. This information may be packaged as a vehicle response request. The urgency of the request may be used to determine a suitable response mode. For example, a response mode made be based on whether the vehicle action will be taken in a time-sensitive or critical situation. The response mode may be based on whether the vehicle is online (e.g., in communication with a transportation management system, or offline. The information describing the scenario may comprise sensor data for the scenario, an environmental representation of the scenario, passenger data, communication data, any other suitable information or combination thereof. The possible vehicle actions may be received from a system of the vehicle (or vehicle management system, as appropriate) for generating possible vehicle actions. The predicted comfort model 230 may provide as output a measure of the predicted perceived rider comfort of the specified vehicle actions based on the input information.

In particular embodiments, the predicted comfort model 230 may be configured to operate at varying degrees of certainty based on the received input. If the input is incomplete, the predicted comfort model 230 may be configured to indicate an uncertainty in the results based on the incomplete information. For example, if there is limited information available about the passengers, the predicted comfort model may output results based on the "average" passenger and indicate as much in the output. As another example, if there is limited sensor data available (e.g., one or more sensors is malfunctioning), the predicted comfort model may output results based on the incomplete data. Additionally, the predicted comfort model 230 may be retrained by comparing predicted values (e.g., predicted comfort levels) to actual values (e.g., received rider evaluations) after enough comparative data has been collected.

In particular embodiments, the model generator system 220 may generate or train a predictive rider preference model 240. The predictive rider preference model 240 may be used for classifying passenger preferences for qualities of the ride during vehicle action responses, such as intensity, comfort, elegance, or experience. In particular embodiments, the rider preference model 240 may be used to infer a preferred category or classification of a ride preference or vehicle action intensity for the passenger of a vehicle when considering which of a plurality of vehicle actions to take. As passengers submit evaluations, the identity of a passenger may be associated with the evaluation, allowing for trends in evaluation data to be determined. Riders may be classified according to their preferred style of response of a vehicle in a given scenario. Example classifications may include "aggressive," "moderate," or "conservative" with each preference having implications on a chosen vehicle action such as rate of acceleration or deceleration, rate of speed, angle of attack, time to response, length of time of action, and many other variables that affect the experience of a passenger in a vehicle. A ride preference classification 245 for a passenger of a vehicle may be output by the rider preference model 240 and passed to the predicted comfort model 230 as an additional input to use when determining a predicted comfort level for a proposed vehicle action. It should be noted that, even if a rider preference model 240 is not available, or a ride preference classification 245 for a given passenger is not available, the predicted comfort model 230 may still operate by determining the predicted comfort level of a proposed vehicle action for the average passenger.

The classification may be used to group passengers in similar classifications to improve the predicted comfort level for that group of passengers. Evaluations of passengers in the same groups or classification may influence the predicted comfort level (and therefore the chosen vehicle action) of other passengers with the same ride preference classification 245. In some cases, a passenger (or group) may be sensitive to particular types of vehicle actions (e.g., hard braking), and may prefer to avoid those actions whenever possible. In some embodiments, that preference may be expressly stated by the passenger, for example when they register for a transportation service employing the techniques described herein. However, in some cases, the passenger may not expressly state their preferences, either because they do not know how, or they are not aware of the particularities of their preferences. In some cases, the passenger's stated preference may be incorrect, for example if they select the wrong option, or they provide an incorrect answer when specifying a nuanced response preference. Therefore, it may be advantageous for a transportation system to be able to determine the passenger's vehicle action intensity preferences based on actual evaluations submitted by the passenger or passengers with one or more commonalities to the passenger.

The model generator system 220 may train the model 240 using a machine-learning procedure. To train the predictive model 240 for passenger preference of vehicle action intensity, the model generator system 220 may provide records of vehicle actions that have been evaluated by the passenger as input. The input records may include information such as the passenger's evaluation, the vehicle action, the environment of the vehicle, and any other collected data regarding the taken vehicle action. In some embodiments, the input records may include evaluations of other passengers based on commonalities between the passengers, such as demographic information, including, but not limited to, height, weight, geographic region, age, etc., based on overlapping and/or similar ratings for other maneuvers or trips in the past, based on expressed vehicle action intensity preference, or other suitable information. Including information from other passengers may be particularly useful when there is an insufficient number of evaluations received from the passenger to suitably train the model 240. Based on these records, the model generator system 220 may train the model 240 to infer a general passenger preference of vehicle action intensity. The model 240 may be trained to provide a general preference (e.g., conservative, aggressive, etc.). The model 240 may be trained to provide a nuanced preference accounting for particular details of the environment (e.g., busy street, weather factors, etc.), the scenario prompting the response (e.g., approaching a stop sign, following a slow-moving truck, etc.), the proposed vehicle action (e.g., braking, or accelerating to overtake), or other suitable details.

In particular embodiments, the models 230 and 240 may be trained using machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learned models may be trained using any suitable training algorithm, including supervised learning based on labeled training data, unsupervised learning based on unlabeled training data, and/or semi-supervised learning based on a mixture of labeled and unlabeled training data.

Although this disclosure describes the generation and use of a predicted comfort model 230 and a rider preference model 240 in the context of an autonomous vehicle, it should be understood that the models could be generated and used in the context of other types of vehicles. For example, the models may be trained using data from one or more semi-autonomous or non-autonomous vehicles, wherein the vehicle actions of a human-operated vehicle are evaluated, with the subsequent data used to generate and train models that may be used by autonomous vehicles. The models may additionally be trained using data generated by simulated vehicles operating in virtual environments for model training purposes. The models may be used for other purposes as well. In particular embodiments, a transportation management system may use a rider preference model 240 when selecting a vehicle from a fleet of vehicles to respond to a service request. In particular embodiments, a predicted comfort model 230 may be used to provide guidance to a human driver of a vehicle, so as to optimize the experience of a passenger of the vehicle. For example, the predicted comfort model 230 may be used to provide notifications to a vehicle operator to slow down, speed up, brake less aggressively, etc., as appropriate.

Figure 3:
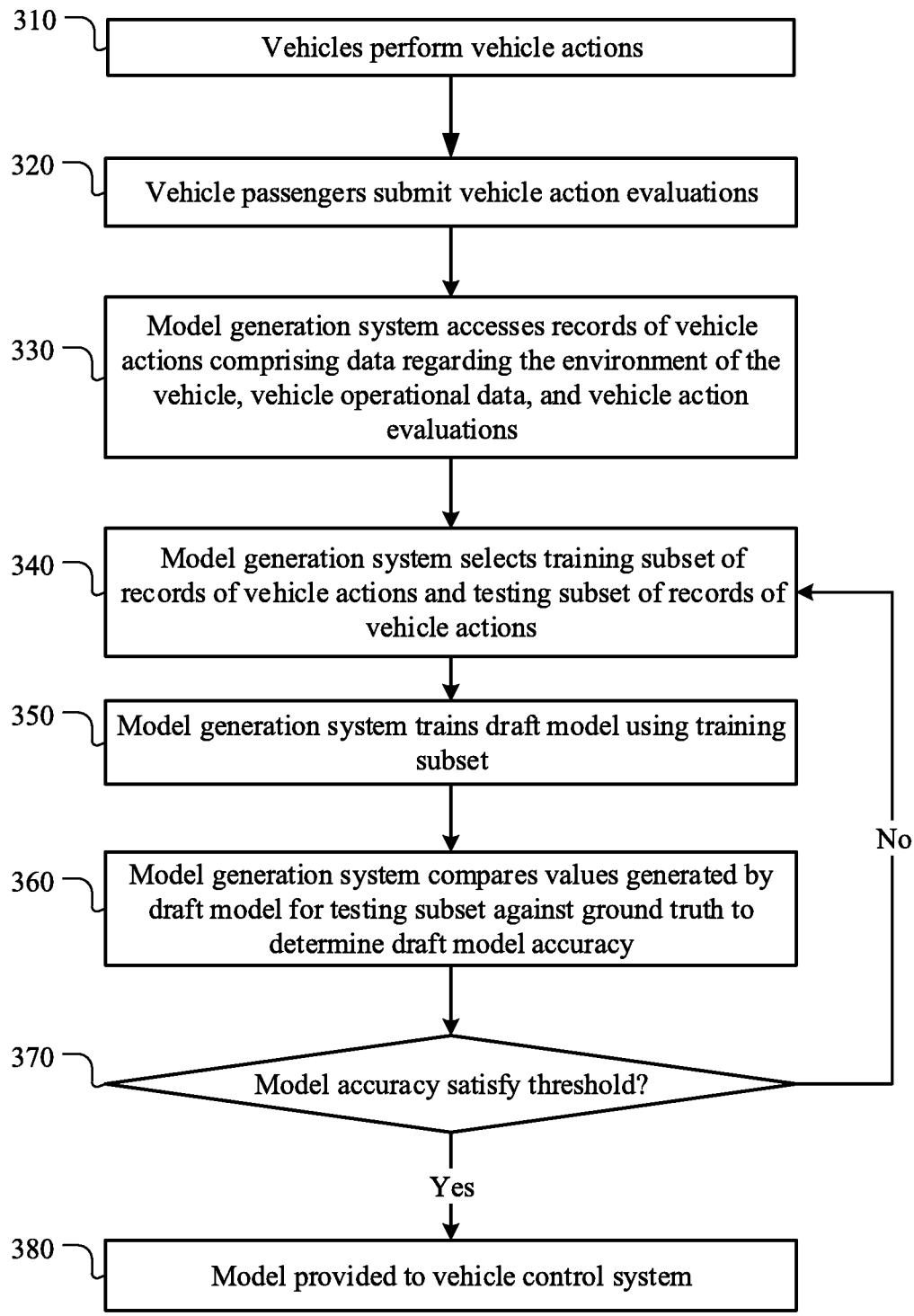
FIG. 3 illustrates an example of a method for generating a subjective route comfort prediction model.

FIG. 3 illustrates an example method 300 for generating a subjective route comfort prediction model and an inferred vehicle action intensity preference model. In particular embodiments, the method may begin at step 310, where one or more vehicles perform vehicle actions. The vehicles may be human-operated, autonomous, or simulated vehicles. As appropriate, the vehicle actions may be performed in simulated environments, in testing facilities (e.g., closed circuits), or may be performed on public or private roads (or other suitable environments). In particular embodiments, a simulated vehicle may include a simulation of driving or passenger experiences provided to passenger, for example, through a computer-based or virtual-reality experience. For example, "passenger" of a simulated-ride may be given a "ride" through a virtual environment using interactive media or virtual-reality. The operations of a simulated vehicle during the "ride" may correspond to operations of a non-virtual vehicle in a similar non-virtual environment. The passenger may evaluate the experience of the simulated ride. In particular embodiments, a simulated vehicle may include a digital model of a vehicle instructed to operate in a digital environment according to a predefined scenario. As the vehicle operates, a comfort level for its operations may be estimated based on similar operations taken by a non-simulated vehicle in a non-virtual environment. In one example, a user may provide feedback based on observation of the digital model. As the vehicles operate in their respective environments, their actions may be recorded by a variety of sensors and computing systems. These sensors and computing systems may store vehicle actions and information about the vehicle actions locally within the vehicle system or may upload them to one or more remote computing systems. In particular embodiments, the vehicle computing systems may be configured to identify particular scenarios and vehicle actions that are likely to be novel, provoke strong reactions from passengers, or would otherwise be of more interest when used in a training dataset.

In particular embodiments, at step 320, one or more passengers of the vehicles may submit one or more vehicle action evaluations to a vehicle management system. In particular embodiments, the passengers may submit the vehicle action evaluations during or soon after the vehicle action has been performed. For example, a vehicle management system may provide an evaluation system within the vehicle, or embodied as an application (e.g., native application or web page) for use by one or more client devices. The evaluation system may provide an interface to allow the user to provide feedback regarding their perceived comfort during the course of their time in the vehicle. In particular embodiments, the evaluations may be required by a vehicle management system after the completion of the ride. For example, before or after the user exits the vehicle, they may be prompted with the opportunity to submit a vehicle action evaluation. The prompt may be delivered to an evaluation system of the vehicle, or to an application on a client device that may or may not be owned by the passenger (e.g., a passenger's mobile phone). In particular embodiments, the user may be reminded of specific scenarios that occurred during their time in the vehicle and may be specifically required to provide vehicle on the vehicle actions taken in response. For example, the user may be shown a timeline of their trip which may have moments in time corresponding to a maneuver or trajectory for which passenger feedback, e.g., perceived comfort level, would be advantageous or about which the vehicle management system would like to obtain feedback. The user may submit the vehicle action evaluations individually or in bulk.

In particular embodiments, at step 330, a model generation system may access records of vehicle actions. The records of each vehicle action may include the vehicle action, the scenario that prompted the vehicle action, data regarding the environment of the vehicle, vehicle operational data, and vehicle action evaluations related to that particular vehicle action, as described above. The model generation system may access the records on a rolling basis, so as to continuously update models it generates. The model generation system may access the records and generate models on a periodic basis, e.g., hourly, daily, or weekly. The rate of model generation may vary based on the type of model being generated.

In particular embodiments, at step 340, the model generation system may determine which of the accessed records of vehicle actions that it will use for model training and testing. The model generation system may be configured to prepare multiple models (e.g., a predicted comfort model 230 or a passenger preference model 240). The model generation system may do so simultaneously, for example using the same input to generate multiple models simultaneously. The model generation system may also prepare several models sequentially, for example, generating a predicted comfort model 230 first and then a passenger preference model 240. The model generation system may select a subset of the accessed records of vehicle actions to use for training data and may selected a subset of the accessed records of vehicle actions to use for testing data.

In particular embodiments, at step 350, the model generator system 220 may train a draft model using the training subset of accessed records. The training procedure may be based on one or more machine-learning-based mechanisms in which the training data is provided to a model generator system. The model generator system 220 may use any suitable machine-learning mechanism, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data. The model generator system 220 employs the machine-learning-based mechanisms to generate or train the model. In many machine-learning approaches, the data is analyzed by the algorithms to determine key components of the data that can be used to make accurate predictions of output from the input data. In some embodiments, the machine-learning mechanisms may be particularly chosen or configured to interpret loosely structured data, such as the environmental scenario depictions described herein. The machine-learning mechanisms may further augment the predictive processes using objective data, such as sensor data included with the vehicle action records. An additional training component may be the received vehicle action evaluations or perceived passenger comfort levels. If the model generator system 220 is training a model predicted comfort model 230, the perceived passenger comfort levels may be used as a target output of the model based on the described input. If the model generator system 220 is training a rider preference model 240 the perceived passenger comfort levels may be used as additional input, where the target output is an accurate classification of the passenger's preferences.

In particular embodiments, at step 360, the model generation system may use the testing subset of accessed records as input to the draft model. The model generation system may compare output values generated by the draft model for the testing subset against ground truth values provided with the accessed records. From this, the model generation system may determine an accuracy rating for the model. In particular embodiments, accuracy may be determined based on a continuous scale, for example, the average difference between a predicted perceived rider comfort for a vehicle action and the reported perceived rider comfort value. In particular embodiments, accuracy may be determined on a more quantized scale, for example, if the difference between a predicted perceived rider comfort value and the reported perceived comfort value for a particular vehicle action is below a threshold, the model may be considered to have accurately predicted that value. The total accuracy may be a comparison of the number of accurate predictions to the total number of predictions made or to the number of inaccurate predictions.

In particular embodiments, at step 370, the model generation system may determine whether the accuracy of the model satisfies an accuracy threshold. If the accuracy satisfies the threshold, the method may advance to step 380 where the model is provided to the vehicle control system. If the accuracy does not satisfy the threshold accuracy, the method may return to step 340. While doing so, the model generation system may alter training and testing conditions to improve the accuracy of the model. For example, the model generation system may alter the size of the training subset or the composition of the training subset, incorporate more uncommon types of vehicle actions or scenarios, alter the size of the testing subset or the composition of the training subset, or perform other actions as appropriate. In particular embodiments, the model generation system may retain the draft model and revise it based on the new training conditions. In particular embodiment, the model generation system may train a new draft model from scratch.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating a subjective route comfort prediction model including the particular steps of the method of FIG. 3, this disclosure contemplates any suitable method for generating a subjective route comfort prediction model including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4B:
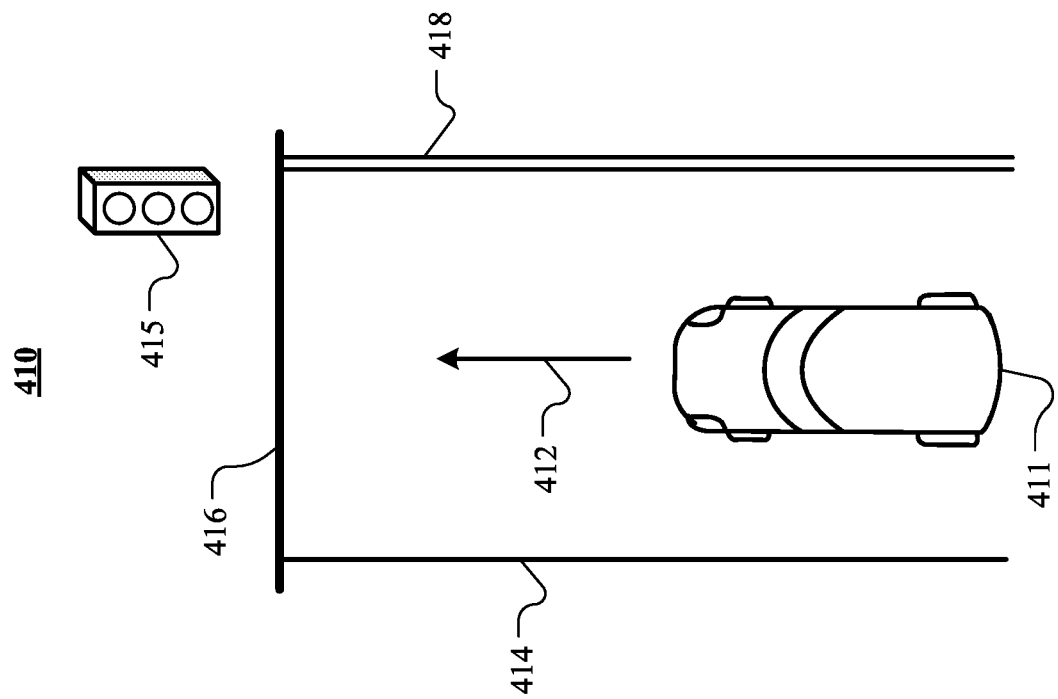
FIGS. 4A-4B illustrate representations of vehicles in vehicle action scenarios.
Figure 4A:
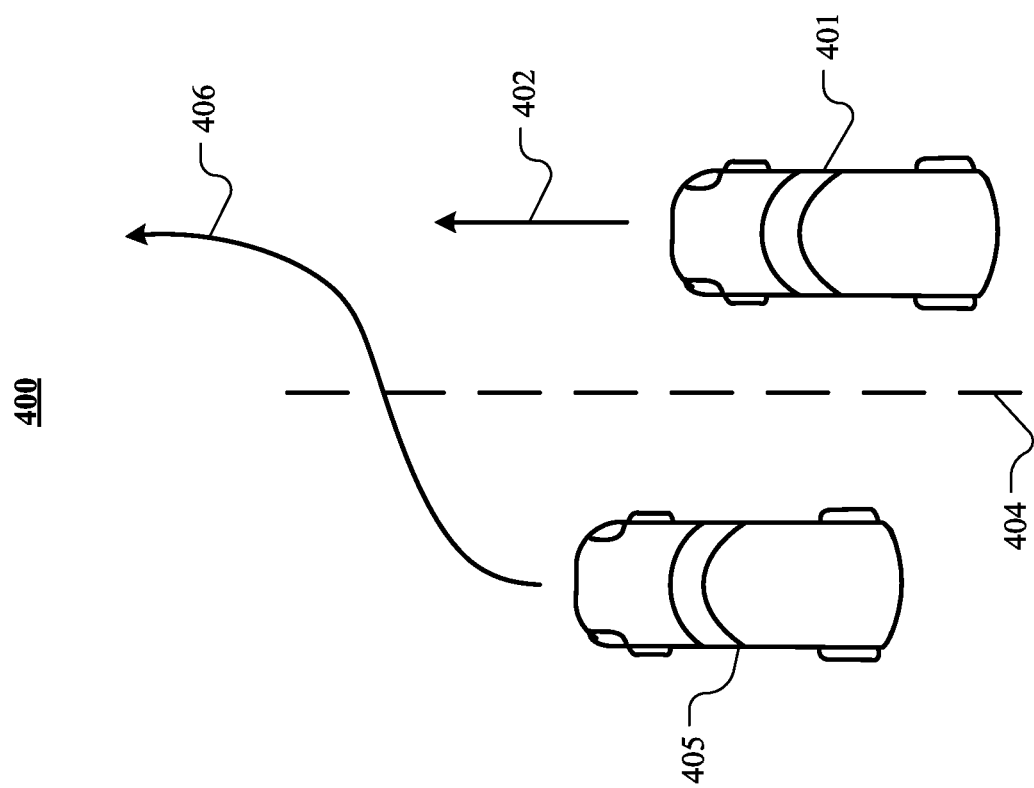

FIGS. 4A-4B illustrate representations of vehicles in scenarios in which a vehicle action may be required. In particular embodiments and as described herein, representations of scenarios may be provided to a model generator system 220 as unconstructed or unstructured representations, collections of data, or any other suitable representations. Using data based on the scenarios, the model generator system 220 may train a subjective route comfort prediction model. In some embodiments, the representations provided to a model generator system 220 may resemble or be understood in reference to the illustrations provided in FIGS. 4A-4B. Although the scenarios illustrated in FIGS. 4A-4B and the related data are described herein in the context of generating a subjective route comfort prediction model, data based on the scenarios may be used by a computing system for controlling a vehicle for a variety of other purposes.

FIG. 4A illustrates a first example scenario representation 400 in which vehicle action was required. A scenario representation 400 similar to that shown in FIG. 4A, or comprising similar data, may be provided to a model generator system 220. In the scenario illustrated in FIG. 4A, the subject vehicle (e.g., the vehicle that took an action) is vehicle 401. The taken vehicle action, also referred to as the recorded action, involved a sudden braking to avoid a vehicle cutting into the lane of traffic. Prior to the recorded action, vehicle 401 was traveling at a particular velocity, indicated by the vector 402. In some embodiments, the velocity of vehicle 401 may also be provided to a model generator system 220 as an objective measure describing the environment of the vehicle 401 in addition to being provided as a part of an unstructured representation. At a time before the vehicle action, vehicle 405 was traveling in the same direction as vehicle 401 in the next lane. A lane divider 404 in the representation indicates that a passing action was permitted. At a time immediately before the subject vehicle action (e.g., the braking) occurred, vehicle 405 merged in front of vehicle 401 without signaling an intent to merge. This action is indicated in the representation 400 by the path of travel vector 406 of the vehicle 405. In response to this action by the vehicle 405, vehicle 401 performed a vehicle action. The vehicle action may have been determined in part based on a predicted comfort level of a passenger of the vehicle.

In the example shown in FIG. 4A, the taken vehicle action was a hard braking action to avoid the vehicle 405. In particular, vehicle 401 braked to avoid rear-ending vehicle 405. In particular embodiments, the vehicle action may be automatically flagged as a vehicle action corresponding to a maneuver or trajectory for which passenger feedback, e.g., perceived comfort level, would be advantageous or about which the vehicle management system would like to obtain feedback. For example, a sensor of the vehicle may have determined sudden acceleration. If a predicted comfort level was used, the predicted comfort level may have satisfied a threshold to flag an evaluation request. The flagging may cause the representation 400, and related data, to be generated, compiled, and sent to a vehicle control system. Objective factors regarding the braking may also be provided to the model generator system 220. Such factors may include, but are not necessarily limited to, the delay between the time the vehicle action scenario is detected and when the braking vehicle action begins, the initial applied braking force, the final applied braking force, the rate of change between the initial and final applied braking forces, the time duration of braking application, the rate of acceleration after release of the brake, and many other factors. Other objective factors may also be provided, such as the distances between the vehicles 401 and 405, and the various points in time that are germane to the taken vehicle action (e.g., while the vehicles are traveling normally, just before the vehicle 405 merged, during the merge maneuver, before the braking action was taken, after the braking action was ended, etc.). The representation 400 may be further provided with evaluations from the passengers of vehicle 401 as input to a model generator system 220. As described above, the model generator system may use the representation 400, related data, and evaluations as part of a subjective route comfort prediction model.

FIG. 4B illustrates a second example scenario representation 410 in which vehicle action was required. The taken vehicle action, also referred to as the recorded action, involved accelerating after a traffic light changed from green to yellow to avoid running a red light. In the illustrated example scenario, the subject vehicle 411 is approaching an intersection that is governed by a traffic signal light 415. The vehicle 411 is travelling in a lane bounded by the solid line divider 414, indicating that the vehicle should not cross the line divider 414 during normal (e.g., non-time-sensitive) operations, and a doubled line 418 indicating a barrier (e.g., a curb) that the vehicle cannot physically cross. Additionally, the representation 416 illustrates the stopping line 416 at which a vehicle should stop (e.g., to avoid impeding cross or foot traffic) when the traffic light is red. The vehicle 411 is traveling at a rate indicated by the vector 412. In particular embodiments, objective measures relating to the vector (e.g., direction and magnitude) may be provided with the representation. At the time that the vehicle is traveling at the rate indicated by the vector 412, the traffic light was green. At a time immediately before the taken vehicle action, the traffic light changed from green to yellow.

In the example shown in FIG. 4B, the taken vehicle action was to accelerate while approaching a traffic light signaling yellow to avoid running a red light. In particular, after the light changed from green to yellow, the vehicle 411 may have accelerated so that it could pass through the intersection before the traffic light 415 changed to red. The acceleration may have been detected as a taken vehicle action that should be flagged as corresponding to a maneuver or trajectory for which passenger feedback, e.g., perceived comfort level, would be advantageous or about which the vehicle management system would like to obtain feedback. In particular, the passenger of the vehicle may have flagged the time of the acceleration as a moment they wished to evaluate. As with the scenario described with respect to FIG. 4A, the objective measures relating to the acceleration may have been recorded by sensors coupled to the vehicle or sensor data generated and collected during the course of normal operations may be preserved to be eventually sent to a model generator 220 with the passenger evaluation. The objective measures may include the rate of acceleration, the duration of the accelerating force, the time delay between the traffic light 415 changing to yellow and the application of the accelerating force, the distance between the vehicle 411 the stopping line 416 when the accelerating force is applied or suspended, any other suitable objective measures, and any combination thereof. The unstructured scenario representation 410 and associated data and the collected objective data may be provided with evaluations from the passengers of vehicle 401 as input to a model generator system 220.

In particular embodiments, the use of unstructured representations of vehicle action scenarios as an alternative or in addition to objective data may have specific benefits over systems relying solely on objective data. For example, using unstructured representations, it may be easier for model generator 220 to capture and analyze the context of the vehicle action. This may be especially helpful in analyzing taken vehicle actions as the degree of subjective comfort experience by passengers may be highly context dependent. For example, a passenger may be more comfortable having experienced a particular braking action when applied when a large truck merges in front of the vehicle than when a bicycle veers into the vehicle's lane of travel. With certain machine learning techniques, the model generator 220 may be more capable of analyzing the overall context of multiple actions to identify common trends and determinative variables. Moreover, unstructured representations may allow the model generator 220 or another analyzing engine to derive similarities between multiple vehicle actions. The model generator 220 may more easily compare taken vehicle actions across a variety of different environments.

Figure 5:
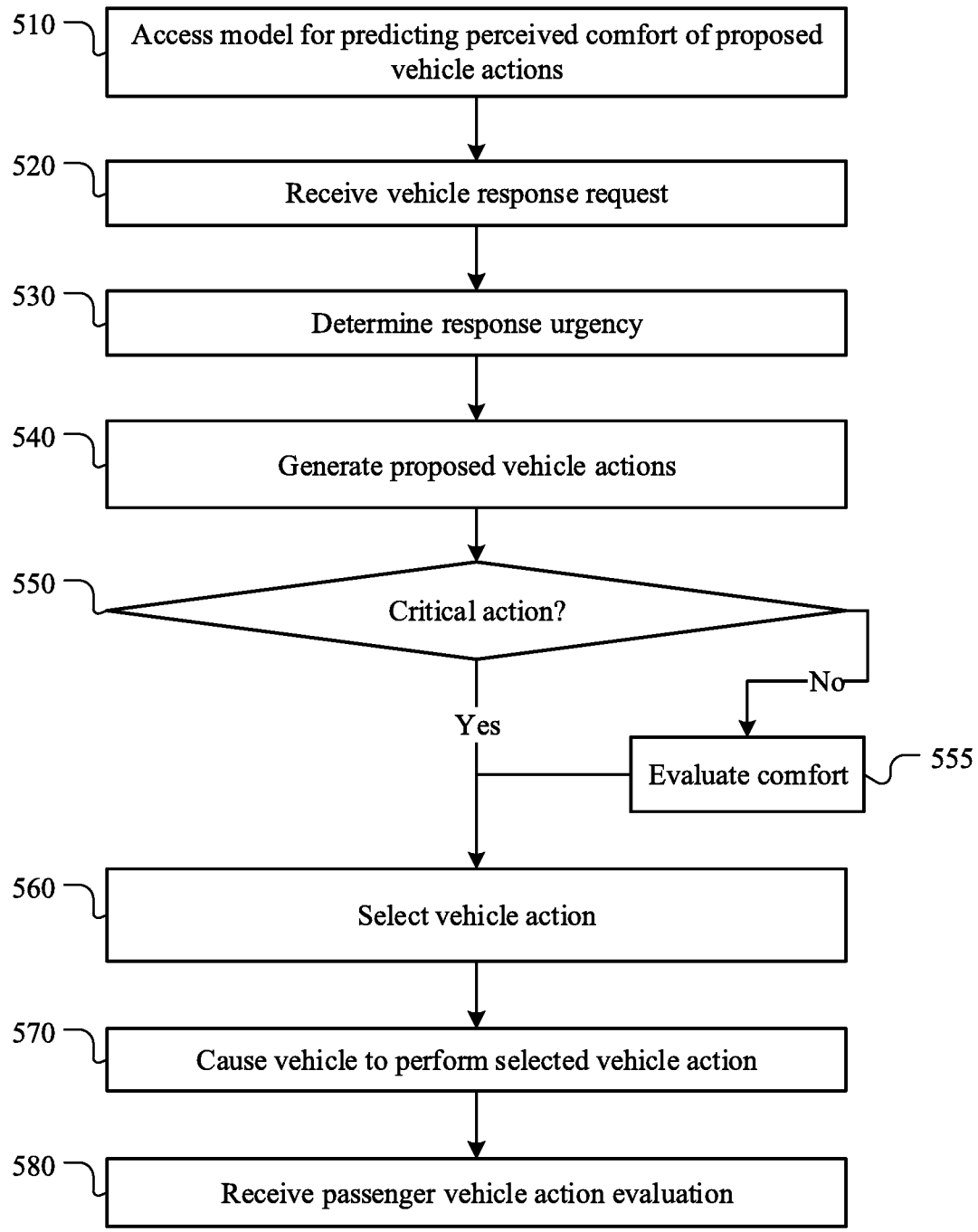
FIG. 5 illustrates an example of a method for providing vehicle action instructions.

FIG. 5 illustrates an example method 500 for providing vehicle action instructions. In particular embodiments, the method may begin at step 510, where a vehicle control system accesses a model for predicting perceived comfort of proposed vehicle actions. The model, such as model 230 may be generated in advance by, for example, a model generator system 220. The model may be generated locally, by a computing system of the vehicle, or remotely, by a computing system associated with a transportation management system or a computing system associated with a fleet of vehicles. The model may be configured to receive, as input, information about one or more proposed vehicles actions. The model may also be configured to receive, as input, a context of the one or more perceived vehicle actions. The context may be received as unstructured representations that correspond to an environment of a vehicle at a time of a proposed vehicle action. The context may also be received as objective data, such as a speed of the vehicle, a distance of the vehicle to one or more objects in the environment, a position of the vehicle in the environment relative to a known or fixed point, or other suitable objective measures. The model may also be configured to receive, as input, information about one or more passengers of a vehicle. The information may be expressed or inferred passenger profiles (e.g., inferred by a rider preference model 240) that comprise information about a passenger's comfort or vehicle action preferences.

In particular embodiments, at step 520, the vehicle control system may receive a vehicle response request. The vehicle response request may comprise information about an environment of the vehicle. The information about the environment of the vehicle may include information such as the number, identity, or movement of one or more objects (including, e.g., other vehicles, pedestrians, animals, and other objects) in the environment of the vehicle. The vehicle response request may comprise context information for the vehicle action, such as whether a prevailing time-sensitive or critical condition (described below) exists. The context information may include a short history of the environment of the vehicle, such as past positions and movements of the vehicle or objects in the environment of the vehicle. The vehicle response request may include a prediction regarding the environment of the vehicle, such as a predicted movement of one or more objects in the environment of the vehicle. The vehicle response request may include information about or received from one or more sensors coupled to a vehicle. This information may include status information for the vehicle, such as a fuel level, fluid level, use levels or limits, passenger capacity, brake wear, tire wear, or any other suitable vehicle status data. Status information may include status information regarding one or more sensors coupled to the vehicle, such as whether the sensor is malfunctioning. The vehicle response request may include information about one or more passengers of the vehicle, including, but not limited to, an express or implied passenger ride comfort or vehicle action intensity preference.

In particular embodiments, at step 530 the vehicle control system may determine a response urgency. The vehicle control system may determine the response urgency based in part on the vehicle response request. The response urgency may refer to the severity of the effect of a delayed response time. For example, the vehicle control system may determine whether a vehicle action performed as a result of the vehicle response request will be used to avert or mitigate one or more time-sensitive, critical, or dangerous conditions. A time-sensitive or critical condition may include, for example, a vehicle action requested in response to another vehicle cutting the requesting vehicle off in traffic, an unexpected object entering the path of the requesting vehicle or approaching the requesting vehicle, dangerous natural or human conditions detected in the environment, or other similar situations. A heightened response urgency may also be triggered when a prevailing time-sensitive or critical condition exists. A prevailing time-sensitive or critical condition may include any action to be taken when a requesting vehicle is determined to be an emergency response vehicle (e.g., an ambulance responding to a call) or acting as an emergency response vehicle (e.g., a non-emergency vehicle being used transport a person to a hospital).

In particular embodiments, at step 540, the vehicle control system may generate one or more proposed vehicle actions based on operational data of the vehicle. The proposed vehicle actions may comprise possible responses based on an environment of the requesting vehicle, a context of the vehicle action request, objects identified from sensor data relating to the request, and data regarding the status and operation of the vehicle. The proposed vehicle actions may include proposed trajectories for the vehicle or response plans. The operational data used to generate the proposed vehicle actions may vary with time and the proposed vehicle actions may include an indication of the impact of the proposed vehicle action on the operational data for the vehicle after execution of the vehicle action. The proposed vehicle actions may be generated based on data about passengers of the vehicle that is available to the vehicle control system, e.g., based on a precited comfort level or a ride preference classification. For example, the vehicle control system may not generate responses that include rapid acceleration, braking, or movement when the vehicle control system is provided data about a passenger of the requesting vehicle that indicates such actions would not be acceptable for the passenger. In particular embodiments, the vehicle control system may generate all possible actions, and later eliminate actions based on passenger preference or requirements according to a passenger preference model. Generating all proposed vehicle actions at once may allow the predicted comfort level of the vehicle actions to be considered at once. This may allow for the optimal vehicle action to be found and executed. Depending on the presented scenario, proposed vehicle actions may differ significantly (e.g., swerving to avoid an object vs. braking hard to avoid the object) or may only differ by a matter of degrees (e.g., accelerating at a first rate vs. accelerating at a second, slower rate). In some embodiments, the proposal and selecting steps may be iterative, wherein a first stage of the process involves determine the type of action to take (e.g., swerving vs. braking). After the type of action is selected, a second round of proposed vehicle actions may be initiated in which the degree of the vehicle action (e.g., how quickly braking occurs) is determined. The iterative or sequential approach may allow the vehicle control system to more quickly arrive at a refined selection once the category of vehicle action is determined.

In particular embodiments, at step 550 the vehicle control system may determine whether the response urgency indicates that the requested vehicle action is a time-sensitive or critical action or otherwise has an elevated response urgency. The outcome of the determination at step 550 may be used to determine a priority for generation or, in some embodiments, the selection of proposed vehicle actions. Specifically, the outcome of the determination at step 550 may be used to determine whether rider comfort is evaluated while selecting a vehicle action. If the vehicle response request is determined not to be a time-sensitive request, or if the responsive vehicle action is determined not to be a time-sensitive or critical vehicle action (e.g., outcome "No"), then, at step 555 the vehicle control system may evaluate the predicted comfort level of each proposed vehicle action (e.g., by use of a predicted comfort model 230). If, however, the vehicle response request is determined to be a time-sensitive or critical request, or if the responsive vehicle action is determined to be a time-sensitive or critical vehicle action (e.g., outcome "Yes"), then, the vehicle control system may bypass applying the comfort model to ensure the most immediate application of the critical movement.

In particular embodiments, at step 560, the vehicle control system may select a vehicle action from the plurality of proposed vehicle actions. If the outcome of step 550 was "Yes," then the vehicle control system may select the most expedient response to the critical or time-sensitive situation. If, however, the outcome was "No," and the comfort of passengers is permitted to be evaluated, the vehicle control system may select the vehicle action based on the predicted comfort level of the vehicle action. In some embodiments the selected vehicle action may be chosen based on a comparison of a first proposed vehicle action to one or more second proposed vehicle actions. The predicted comfort level of each proposed vehicle action may be determined. The vehicle control system may select the proposed vehicle action that it determines has the greatest likelihood of satisfying an expected comfort level of a passenger of the vehicle. In some embodiments, the expected comfort level of a passenger of a vehicle may be chosen for the average or median passenger. This embodiment allows for passenger comfort to be considered, even when information about the identity of the passenger or their own subjective preferences is not available. In some embodiments, the expected comfort level may be based on the particular passenger or group of passengers in the vehicle. For example, passengers may be classified according to their preference for vehicle responses (e.g., "aggressive," "moderate," or "conservative"). The expected comfort level may be personalized and determined for the individual passenger or group of passengers.

In some embodiments, the selected vehicle action may be selected based on its predicted comfort level satisfying a threshold comfort level. As described previously, the threshold comfort level may be based on the preferences of the average, or median, passenger, a group of passengers, or each passenger individually. The threshold comfort level may be expressed by, or designated for, a passenger of the vehicle. For example, as a predicted comfort level is determined for each proposed vehicle action, it may be compared to a threshold comfort level. If the predicted comfort level fails to satisfy the threshold, it may be excluded from further consideration. As another example, if a predicted comfort level exceeds a threshold level, it may be automatically accepted without considering other proposed vehicle actions. Doing so may improve processing time, allowing the system to function more quickly and efficiently. In some embodiments, the selected vehicle action may be selected based on a ranking of the proposed vehicle actions. For example, the proposed vehicle actions may be ranked based in part on a predicted comfort level predicted for each proposed vehicle action. The selected vehicle action may be chosen based on being a top-ranked vehicle action. Additionally, the selected vehicle action may be selected according to the predicted comfort level predicted for multiple passengers of the vehicle. If, for example, a vehicle action intensity preference differs for multiple passengers of the vehicle, the selected vehicle action may be selected based on satisfying the most stringent of the passenger vehicle action intensity preferences. In particular embodiments, the vehicle control system may prioritize one or more passengers based on their identities. The vehicle control system may perform a weighted combination of their preferences when analyzing the proposed vehicle actions and predicted comfort levels. For example, an elderly passenger's preferences may be assigned a greater weighting than a child's preferences. As another example, preferences of an owner or primary user of the vehicle may be assigned a greater weighting than another passenger.

In particular embodiments, at step 570, the vehicle control system may cause the vehicle to perform the selected vehicle action. The vehicle control system may provide instructions to one or more subsystems of the vehicle or one or more controllers for the components of the vehicle that will cause the vehicle action to be performed. For example, if the selected vehicle action was to brake, as in the example scenario depicted in FIG. 4A, the vehicle control system may provide instructions to the various components of the vehicle that will cause the vehicle to brake at a rate and duration specified in the proposed vehicle action. As another example, if the selected vehicle action was to accelerate, as in the example scenario depicted in FIG. 4B, the vehicle control system may provide instructions to the various components of the vehicle that will cause the vehicle to accelerate at a rate and duration specified in the proposed vehicle action.

In particular embodiments, at step 580, the vehicle control system may receive an evaluation of the selected vehicle action after the vehicle action has been performed by the vehicle. For example, the vehicle control system may prompt the passenger to provide feedback by identifying particular vehicle actions and requesting feedback or by providing a mechanism to for the passenger to select vehicle actions that occurred over the course of their time in the vehicle. The feedback may be requested and/or provided through a user interface of an application associated with a transportation management system that is executing on a user device of the passenger. The feedback may be requested through a messaging service, such as email or text messaging, associated with or used by the transportation management system. The transportation management system may provide a mechanism to allow a user to track their ride in the vehicle and flag actions for which they would like to provide feedback (e.g., perceived comfort level) live during the trip. For example, while a passenger is riding in a vehicle, they may be provided access to a mechanism to mark a current or past point in time during which a vehicle action occurred that the passenger would like to evaluate. Additionally, the vehicle control system may note particular vehicle actions for which to later solicit passenger evaluation, based on the predicted comfort level for the vehicle action. As described above, the received evaluation may be used to train or update a model for predicting a comfort level of a vehicle action, to train or update a model for inferring a preferred vehicle action intensity of a passenger, or for any other suitable purpose of the vehicle control system. The received evaluation may be stored in a record of the performed vehicle action in conjunction with data regarding the environment of the vehicle before, during, or after the vehicle action is performed, operational data of the vehicle, and other suitable information.

FIG. 5 illustrates one order of the steps of the method 500. However, the order of the particular steps may be rearranged in certain instances. For example, the determination, in step 550 of whether a critical or time-sensitive response is required may be made prior to step 540. The proposed vehicle actions generated may be based on the critical nature of the response. For example, a smaller subset of proposed vehicle actions may be generated to facilitate faster response times for the vehicle. Furthermore, predicted comfort levels may not be considered when generating proposed vehicle actions in a critical-response scenario.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing vehicle action instructions including the particular steps of the method of FIG. 5, this disclosure contemplates any suitable method for providing vehicle action instructions including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6B:
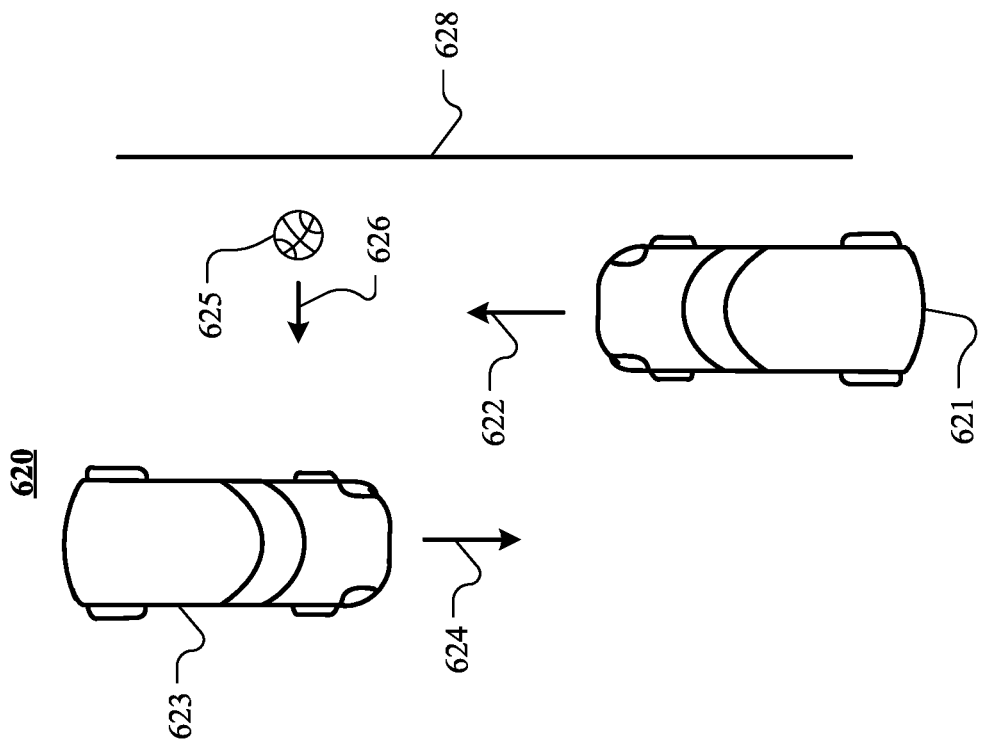
FIGS. 6A-6B illustrate representations of vehicles in vehicle action scenarios.
Figure 6A:
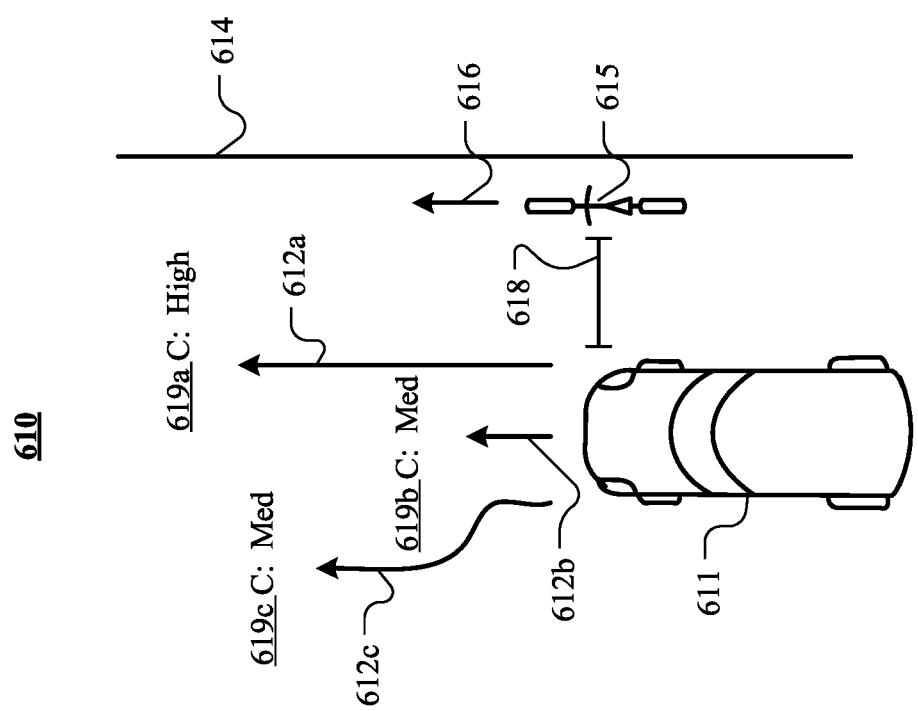

FIG. 6A illustrates an example scenario representation 610. In particular embodiments, the representation 610, or one based in similar principles, may be provided as input to a predicted comfort model 230. For example, when the subject vehicle 611 encounters the illustrated scenario, a vehicle control system may generate or access the scenario representation, objective measures (e.g., sensor data), identities or preferences of a passenger of the vehicle, and other descriptive information. The vehicle control system may use the collected information to generate and determine an action to take in response. For example, the vehicle control system of the subject vehicle 611 may generate a vehicle action request for a vehicle planning module associated with the vehicle control system. In the illustrated scenario 610, subject vehicle 611 is traveling along a road. The rate of speed of the vehicle 611 may be measured as an objective factor. The vehicle has come across a bicycle 615 riding in the road between the vehicle 611 and the side lane marker 614. The bicycle is travelling at a speed indicated by the vector 616. The speed may be measured as an objective factor. The distance between the side of the vehicle 611 and the bicycle 615 is indicated by the marker 618. The distance may also be measured as an objective factor. The representation 610 may be used as a distillation of information that may be used by a pre-generated predicted comfort model 230.

The vehicle control system (e.g., the vehicle planning module) may generate multiple proposed vehicle actions, for example, 612a, 612b, 612c. The vehicle control system may use the representation, objective factors, and other collected information as input to pre-generated predicted comfort model 230. The predicted comfort model may allow the vehicle control system to predict the comfort level that will likely be perceived by the one or more passengers of the vehicle as the vehicle performs a selected vehicle action. For example, one proposed vehicle action 612b may be for the vehicle 611 to slow down and avoid passing the bicycle 615 by traveling at the same rate of speed as the bicycle 615 until the bicycle 615 can enter a protected lane on the road. Another proposed vehicle action 612a may be for the vehicle 611 to accelerate to quickly pass the bicycle 615. Another proposed vehicle action 612c may be for the vehicle 611 to accelerate and swerve away from the bicycle 615, increasing the distance between vehicle 611 and the bicycle 615 while passing. Another proposed vehicle action (not pictured) may be for the vehicle 611 to honk, alerting the operator of the bicycle 615 to the presence of the vehicle 611 before the vehicle 611 passes the bicycle 618. Variations on the rate and aggressiveness of the acceleration, braking, steering, and other components of the proposed vehicle actions may also be submitted to the predicted comfort model 230. Having determined that a response is not time-sensitive in this example, the predicted comfort model 230 may generate a predicted comfort level 619a-c for each proposed vehicle action. Based on the predicted perceived comfort levels associated with the vehicle actions, the vehicle control system may select and execute a vehicle action.

FIG. 6B illustrates another example scenario representation 620. In particular embodiments, the representation 620, or one based in similar principles, may be provided as input to a predicted comfort model 230. For example, when the subject vehicle 621 encounters the illustrated scenario, a vehicle control system may generate or access the scenario representation, objective measures (e.g., sensor data), identities or preferences of a passenger of the vehicle, and other descriptive information. The vehicle control system may use the collected information to determine an action to take in response. For example, the vehicle control system of the subject vehicle 621 may submit a vehicle action request to a vehicle planning module associated with the vehicle control system. In the illustrated scenario 620, subject vehicle 621 is traveling along a road at a rate of speed indicated by the vector 622. The speed may be measured as an objective factor. As the vehicle travels, a basketball 625 enters the road front beyond the right lane marker 628 in front of the vehicle 621 at a rate of speed indicated by the vector 626. The speed may be measured as an objective factor. Another vehicle 623 may be approaching the vehicle 621 as oncoming traffic travelling in a lane to the left of the vehicle 621. The vehicle 623 may be traveling at a rate of speed indicated by the vector 624. The speed may be measured as an objective factor. The representation 620 may be used as a distillation of information that may be used by a pre-generated predicted comfort model 230.

Based on the received information, the vehicle control system (e.g., the vehicle planning module) may determine that a critical and time-sensitive response is required, e.g., to avoid colliding with the basketball 625. The vehicle control system may use an expedited decision-making process. The vehicle control system may generate proposed vehicle actions. The vehicle control system may use the representation, objective factors, and other collected information while generating the proposed vehicle actions. Because of the critical nature of the response, the vehicle control system may only generate actions that appropriately respond to the scenario (e.g., avoid both the basketball 625 and the oncoming vehicle 623). The predicted comfort model 230 may not be used in responding to this scenario. For example, one proposed vehicle action may be for the vehicle 621 to immediately apply heavy braking to avoid hitting the basketball 625. Another proposed vehicle action may be for the vehicle 611 to swerve to the right to avoid the basketball. The vehicle control system may select a vehicle action based on a determination of the least likely to cause harm to the passenger and other persons in the environment. The vehicle control system may execute the selected vehicle action.

Figure 7:
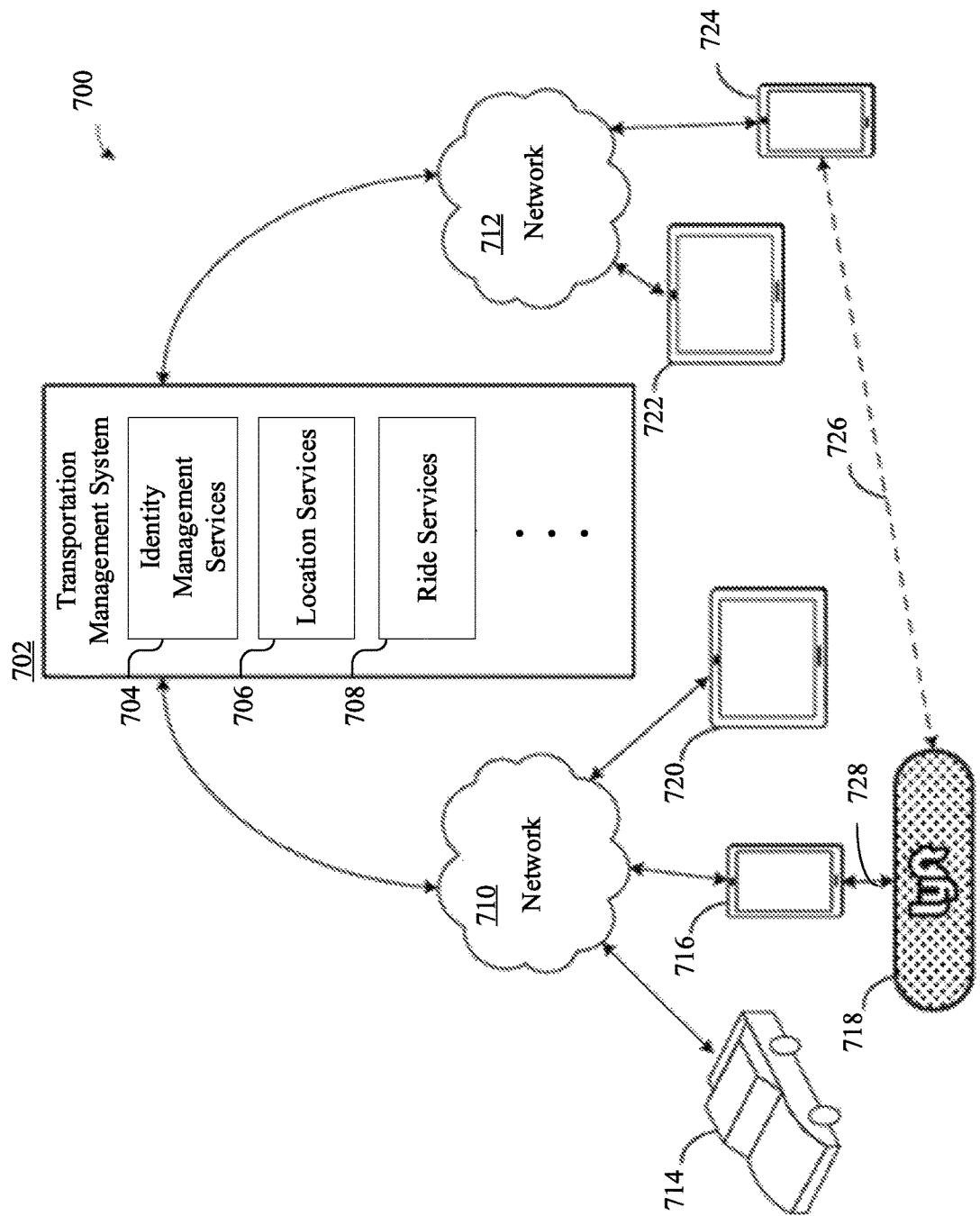
FIG. 7 illustrates an example block diagram of a transportation management environment.

FIG. 7 shows a transportation management environment 700, in accordance with particular embodiments. For example, a transportation management system 702 executing on one or more servers or distributed systems may be configured to provide various services to ride requestors and providers. Ride providers may include, e.g., human operators or operating autonomous vehicles. In particular embodiments, the transportation management system 702 may include software modules or applications, including, e.g., identity management services 704, location services 706, ride services 708, and/or any other suitable services. Although a particular number of services are shown as being provided by system 702, more or fewer services may be provided in various embodiments. As an example, the transportation management system 702 may perform operations of a vehicle control system associated with one or more autonomous vehicles described herein. The transportation management system 702 may coordinate with one or more other systems to operate an autonomous vehicle control system. In addition, although these services are shown as being provided by the system 702, all or a portion of any of the services may be processed in a distributed fashion. For example, computations associated with a service task may be performed by a combination of the transportation management system 702 (including any number of servers, databases, etc.), one or more devices associated with the provider (e.g., devices integrated with the managed vehicles 714, provider's computing devices 716 and tablets 720, and transportation management vehicle devices 718), and/or one or more devices associated with the ride requestor (e.g., the requestor's computing devices 724 and tablets 722). In particular embodiments, the transportation management system 702 may include one or more general purpose computers, server computers, distributed computing systems, clustered computing systems, cloud-based computing systems, or any other computing systems or arrangements of computing systems. The transportation management system 702 may be configured to run any or all of the services and/or software applications described herein. In particular embodiments, the transportation management system 702 may include an appropriate operating system as well as various server applications, such as web servers capable of handling hypertext transport protocol (HTTP) requests, file transfer protocol (FTP) servers, database servers, etc.

In particular embodiments, identity management services 704 may be configured to, e.g., perform authorization services for requestors and providers and manage their interactions and data with the transportation management system 702. This may include, e.g., authenticating the identity of providers and determining that they are authorized to provide services through the transportation management system 702. Similarly, requestors' identities may be authenticated to determine whether they are authorized to receive the requested services through the transportation management system 702. Identity management services 704 may also manage and control access to provider and requestor data maintained by the transportation management system 702, such as driving and/or ride histories include ride evaluations, vehicle data, personal data, preferences, usage patterns as a ride provider and as a ride requestor, profile pictures, linked third-party accounts (e.g., credentials for music or entertainment services, social-networking systems, calendar systems, task-management systems, etc.), vehicle action intensity preferences, and any other associated information. The management service 704 may also manage and control access to provider/requestor data stored with and/or obtained from third-party systems. For example, a requester or provider may grant the transportation management system 702 access to a third-party email, calendar, or task management system (e.g., via the user's credentials). As another example, a requestor or provider may grant, through a mobile device (e.g., 716, 720, 722, and 724), a transportation application associated with the transportation management system 702 access to data provided by other applications installed on the mobile device. Such data may be processed on the client and/or uploaded to the transportation management system 702 for processing, if so desired.

In particular embodiments, the transportation management system 702 may provide location services 706, which may include navigation and/or traffic management services and user interfaces. For example, the location services 706 may be responsible for querying devices associated with the provider (e.g., vehicle 714, computing device 716, tablet 720, transportation management vehicle device 718) and the requester (e.g., computing device 724 and tablet 722) for their locations. The location services 706 may also be configured to track those devices to determine their relative proximities, generate relevant alerts (e.g., proximity is within a threshold distance), generate navigation recommendations, and any other location-based services.

In particular embodiments, the transportation management system 702 may provide ride services 708, which may include ride matching and management services to connect a requestor to a provider. For example, after the identity of a ride requestor has been authenticated by the identity management services module 704, the ride services module 708 may attempt to match the requestor with one or more ride providers. In particular embodiments, the ride services module 708 may identify an appropriate provider using location data obtained from the location services module 706. The ride services module 708 may use the location data to identify providers who are geographically close to the requestor (e.g., within a certain threshold distance or travel time) and further identify those who are a good match with the requestor. The ride services module 708 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 708 may use rule-based algorithms or machine-learning models for matching requestors and providers.

The transportation management system 702 may communicatively connect to various devices through networks 710 and 712. Networks 710, 712 may include any combination of interconnected networks configured to send and/or receive data communications using various communication protocols and transmission technologies. In particular embodiments, networks 710, 712 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 710, 712 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 710, 712 may each include any combination of networks described herein or known to one of ordinary skill in the art.

In particular embodiments, devices within a vehicle may be interconnected. For example, any combination of the following may be communicatively connected: vehicle 714, provider computing device 716, provider tablet 720, transportation management vehicle device 718, requestor computing device 724, requestor tablet 722, and any other device (e.g., smart watch, smart tags, etc.). For example, the transportation management vehicle device 718 may be communicatively connected to the provider computing device 716 and/or the requestor computing device 724. The transportation management vehicle device 718 may connect 726, 728 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 702 using applications executing on their respective computing devices (e.g., 714, 716, 718, and/or 720), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 714 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 702. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 8:
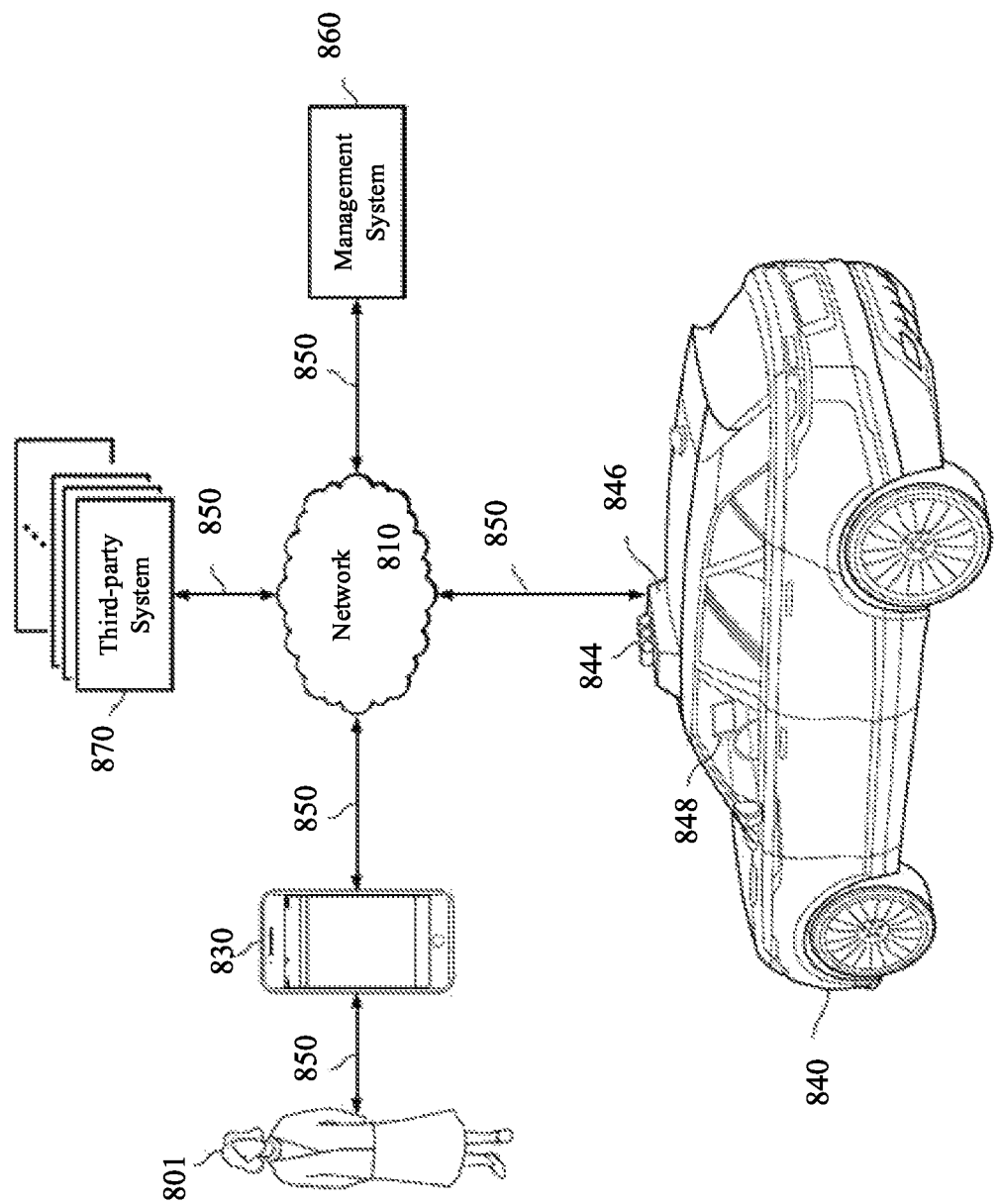
FIG. 8 illustrates an example block diagram of a transportation management environment for matching ride requestors with autonomous vehicles.

FIG. 8 illustrates an example block diagram of a transportation management environment for matching ride requestors with autonomous vehicles. In particular embodiments, the environment may include various computing entities, such as a user computing device 830 of a user 801 (e.g., a ride provider or requestor), a transportation management system 860, an autonomous vehicle 840, and one or more third-party system 870. The computing entities may be communicatively connected over any suitable network 810. As an example and not by way of limitation, one or more portions of network 810 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 8 illustrates a single user device 830, a single transportation management system 860, a single vehicle 840, a plurality of third-party systems 870, and a single network 810, this disclosure contemplates any suitable number of each of these entities. As an example and not by way of limitation, the network environment may include multiple users 801, user devices 830, transportation management systems 860, autonomous-vehicles 840, third-party systems 870, and networks 810.

The user device 830, transportation management system 860, autonomous vehicle 840, and third-party system 870 may be communicatively connected or co-located with each other in whole or in part. These computing entities may communicate via different transmission technologies and network types. For example, the user device 830 and the vehicle 840 may communicate with each other via a cable or short-range wireless communication (e.g., Bluetooth, NFC, WI-FI, etc.), and together they may be connected to the Internet via a cellular network that is accessible to either one of the devices (e.g., the user device 830 may be a smartphone with LTE connection). The transportation management system 860 and third-party system 870, on the other hand, may be connected to the Internet via their respective LAN/WLAN networks and Internet Service Providers (ISP). FIG. 8 illustrates transmission links 850 that connect user device 830, autonomous vehicle 840, transportation management system 860, and third-party system 870 to communication network 810. This disclosure contemplates any suitable transmission links 850, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 850 may connect to one or more networks 810, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 850. For example, the user device 830 may communicate with the transportation management system via a cellular network and the Internet, but communicate with the autonomous vehicle 840 via Bluetooth or a physical wire connection.

In particular embodiments, the transportation management system 860 may fulfill ride requests for one or more users 801 by dispatching suitable vehicles. The transportation management system 860 may receive any number of ride requests from any number of ride requestors 801. In particular embodiments, a ride request from a ride requestor 801 may include an identifier that identifies the ride requestor in the system 860. The transportation management system 860 may use the identifier to access and store the ride requestor's 801 information, in accordance with the requestor's 801 privacy settings. The ride requestor's 801 information may be stored in one or more data stores (e.g., a relational database system) associated with and accessible to the transportation management system 860. In particular embodiments, ride requestor information may include profile information about a particular ride requestor 801. In particular embodiments, the ride requestor 801 may be associated with one or more categories or types, through which the ride requestor 801 may be associated with aggregate information about certain ride requestors of those categories or types. Ride information may include, for example, preferred pick-up and drop-off locations, driving preferences (e.g., vehicle action intensity preferences, comfort level, preferred speed, rates of acceleration/deceleration, distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, and as described herein, the transportation management system 860 may classify a user 801 based on known information about the user 801 (e.g., using machine-learning classifiers), and use the classification to retrieve relevant aggregate information associated with that class. As an example and not by way of limitation, the system 860 may classify a user 801 as a young adult and retrieve relevant aggregate information associated with young adults, such as the type of music generally preferred by young adults.

Transportation management system 860 may also store and access ride information. Ride information may include locations related to the ride, traffic data, route options, optimal pick-up or drop-off locations for the ride, ride comfort, ride evaluations, evaluation events, or any other suitable information associated with a ride. As an example and not by way of limitation, when the transportation management system 860 receives a request to travel from San Francisco International Airport (SFO) to Palo Alto, Calif., the system 860 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; any other suitable information associated with the ride. In particular embodiments, portions of the ride information may be based on historical data associated with historical rides facilitated by the system 860. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 860. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 860 in particular embodiments may predict and provide ride suggestions in response to a ride request. In particular embodiments, the system 860 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 860 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 860 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 830 (which may belong to a ride requestor or provider), a transportation management system 860, vehicle system 840, or a third-party system 870 to process, transform, manage, retrieve, modify, add, or delete the information stored in the data store.

In particular embodiments, transportation management system 860 may include an authorization server (or any other suitable component(s)) that allows users 801 to opt-in to or opt-out of having their information and actions logged, recorded, or sensed by transportation management system 860 or shared with other systems (e.g., third-party systems 870). In particular embodiments, a user 801 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 801 of transportation management system 860 through blocking, data hashing, anonymization, or other suitable techniques as appropriate.

In particular embodiments, third-party system 870 may be a network-addressable computing system that may provide HD maps or host GPS maps, customer reviews, music or content, weather information, or any other suitable type of information. Third-party system 870 may generate, store, receive, and send relevant data, such as, for example, map data, customer review data from a customer review website, weather data, or any other suitable type of data. Third-party system 870 may be accessed by the other computing entities of the network environment either directly or via network 810. For example, user device 830 may access the third-party system 870 via network 810, or via transportation management system 860. In the latter case, if credentials are required to access the third-party system 870, the user 801 may provide such information to the transportation management system 860, which may serve as a proxy for accessing content from the third-party system 870.

In particular embodiments, user device 830 may be a mobile computing device such as a smartphone, tablet computer, or laptop computer. User device 830 may include one or more processors (e.g., CPU and/or GPU), memory, and storage. An operating system and applications may be installed on the user device 830, such as, e.g., a transportation application associated with the transportation management system 860, applications associated with third-party systems 870, and applications associated with the operating system. User device 830 may include functionality for determining its location, direction, or orientation, based on integrated sensors such as GPS, compass, gyroscope, or accelerometer. User device 830 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 830 may also include one or more cameras, scanners, touchscreens, microphones, speakers, and any other suitable input-output devices.

In particular embodiments, the vehicle 840 may be an autonomous vehicle and equipped with an array of sensors 844, a navigation system 846, and a ride-service computing device 848. In particular embodiments, a fleet of autonomous vehicles 840 may be managed by the transportation management system 860. The fleet of autonomous vehicles 840, in whole or in part, may be owned by the entity associated with the transportation management system 860, or they may be owned by a third-party entity relative to the transportation management system 860. In either case, the transportation management system 860 may control the operations of the autonomous vehicles 840, including, e.g., dispatching select vehicles 840 to fulfill ride requests, instructing the vehicles 840, for example through a vehicle control system, to perform select operations (e.g., head to a service center or charging/fueling station, pull over, stop immediately, self-diagnose, lock/unlock compartments, change music station, change temperature, and any other suitable operations), and instructing the vehicles 840 to enter select operation modes (e.g., operate normally, drive at a reduced speed, drive under the command of human operators, and any other suitable operational modes).

In particular embodiments, the autonomous vehicles 840 may receive data from and transmit data to the transportation management system 860 and the third-party system 870. Example of received data may include, e.g., instructions, new software or software updates, maps, 3D models, trained or untrained machine-learning models, location information (e.g., location of the ride requestor, the autonomous vehicle 840 itself, other autonomous vehicles 840, and target destinations such as service centers), navigation information, traffic information, weather information, entertainment content (e.g., music, video, and news) ride requestor information, ride information, and any other suitable information. Examples of data transmitted from the autonomous vehicle 840 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 840, passengers may send/receive data to the transportation management system 860 and/or third-party system 870), and any other suitable data.

In particular embodiments, autonomous vehicles 840 may also communicate with each other as well as other traditional human-driven vehicles, including those managed and not managed by the transportation management system 860. For example, one vehicle 840 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 860 or third-party system 870).

In particular embodiments, an autonomous vehicle 840 may obtain and process sensor/telemetry data. Such data may be captured by any suitable sensors. For example, the vehicle 840 may have aa Light Detection and Ranging (LiDAR) sensor array of multiple LiDAR transceivers that are configured to rotate 360°, emitting pulsed laser light and measuring the reflected light from objects surrounding vehicle 840. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 840. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 840 may have optical cameras pointing in different directions. The cameras may be used for, e.g., recognizing roads, lane markings, street signs, traffic lights, police, other vehicles, and any other visible objects of interest. To enable the vehicle 840 to "see" at night, infrared cameras may be installed. In particular embodiments, the vehicle may be equipped with stereo vision for, e.g., spotting hazards such as pedestrians or tree branches on the road. As another example, the vehicle 840 may have radars for, e.g., detecting other vehicles and/or hazards afar. Furthermore, the vehicle 840 may have ultrasound equipment for, e.g., parking and obstacle detection. In addition to sensors enabling the vehicle 840 to detect, measure, and understand the external world around it, the vehicle 840 may further be equipped with sensors for detecting and self-diagnosing the vehicle's own state and condition. For example, the vehicle 840 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 840 may build a 3D model of its surrounding based on data from its LiDAR, radar, sonar, and cameras, along with a pre-generated map obtained from the transportation management system 860 or the third-party system 870. Although sensors 844 appear in a particular location on autonomous vehicle 840 in FIG. 8, sensors 844 may be located in any suitable location in or on autonomous vehicle 840. Example locations for sensors include the front and rear bumpers, the doors, the front windshield, on the side panel, or any other suitable location.

In particular embodiments, the autonomous vehicle 840 may be equipped with a processing unit (e.g., one or more CPUs and GPUs), memory, and storage. The vehicle 840 may thus be equipped to perform a variety of computational and processing tasks, including processing the sensor data, extracting useful information, and operating accordingly. For example, based on images captured by its cameras and a machine-vision model, the vehicle 840 may identify particular types of objects captured by the images, such as pedestrians, other vehicles, lanes, curbs, and any other objects of interest.

In particular embodiments, the autonomous vehicle 840 may have a navigation system 846 responsible for safely navigating the autonomous vehicle 840. In particular embodiments, the navigation system 846 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 846 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 846 may use its determinations to control the vehicle 840 to operate in prescribed manners and to guide the autonomous vehicle 840 to its destinations without colliding into other objects. Although the physical embodiment of the navigation system 846 (e.g., the processing unit) appears in a particular location on autonomous vehicle 840 in FIG. 8, navigation system 846 may be located in any suitable location in or on autonomous vehicle 840. Example locations for navigation system 846 include inside the cabin or passenger compartment of autonomous vehicle 840, near the engine/battery, near the front seats, rear seats, or in any other suitable location.

In particular embodiments, the autonomous vehicle 840 may be equipped with a ride-service computing device 848, which may be a tablet or any other suitable device installed by transportation management system 860 to allow the user to interact with the autonomous vehicle 840, transportation management system 860, other users 801, or third-party systems 870. In particular embodiments, installation of ride-service computing device 848 may be accomplished by placing the ride-service computing device 848 inside autonomous vehicle 840 and configuring it to communicate with the vehicle 840 via a wire or wireless connection (e.g., via Bluetooth). Although FIG. 8 illustrates a single ride-service computing device 848 at a particular location in autonomous vehicle 840, autonomous vehicle 840 may include several ride-service computing devices 848 in several different locations within the vehicle. As an example and not by way of limitation, autonomous vehicle 840 may include four ride-service computing devices 848 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 848 may be detachable from any component of autonomous vehicle 840. This may allow users to handle ride-service computing device 848 in a manner consistent with other tablet computing devices. As an example and not by way of limitation, a user may move ride-service computing device 848 to any location in the cabin or passenger compartment of autonomous vehicle 840, may hold ride-service computing device 848, or handle ride-service computing device 848 in any other suitable manner. Although this disclosure describes providing a particular computing device in a particular manner, this disclosure contemplates providing any suitable computing device in any suitable manner.

Figure 9:
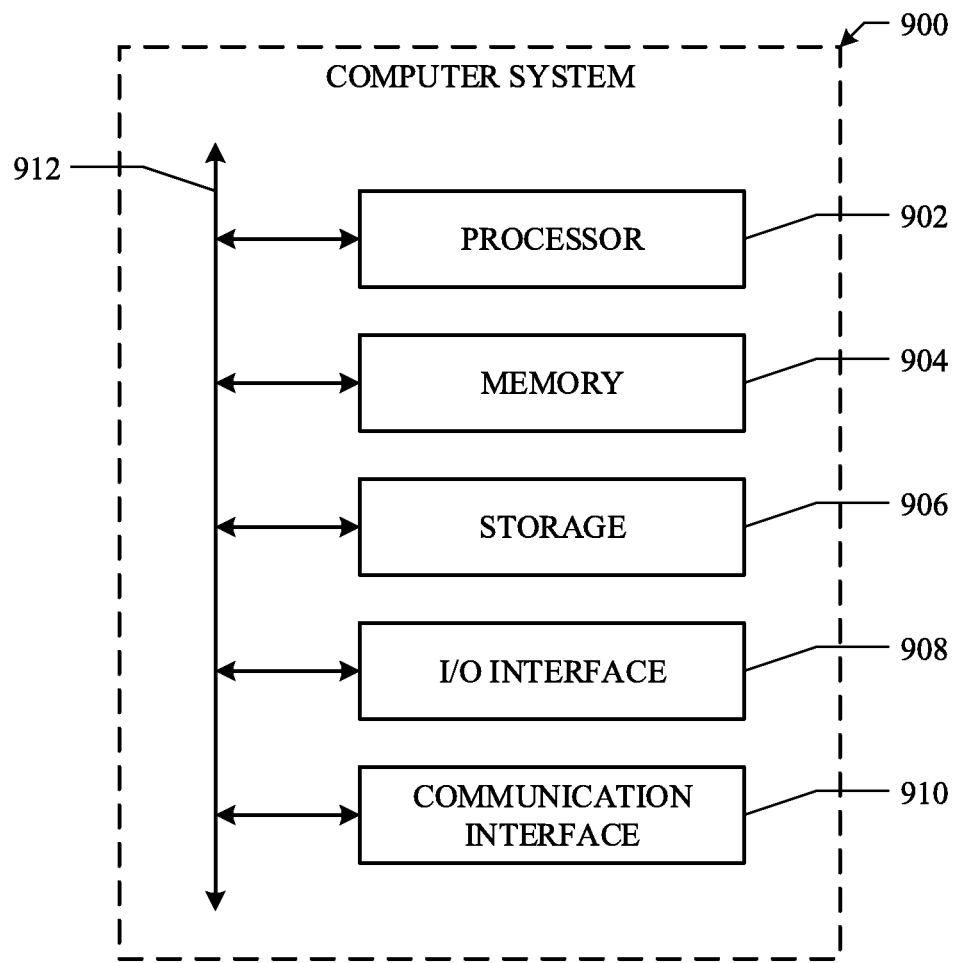
FIG. 9 illustrates an example of a computing system.

FIG. 9 illustrates an example computer system 900. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 that are to be operated on by computer instructions; the results of previous instructions executed by processor 902 that are accessible to subsequent instructions or for writing to memory 904 or storage 906; or any other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs), be a multi-core processor, or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of a vehicle:
    determining an external environment of the vehicle based on data received from external environmental sensors of the vehicle;
        generating a plurality of proposed vehicle actions associated with vehicle status data based on the external environment of the vehicle;
        determining a respective comfort level for each proposed vehicle action of the plurality of proposed vehicle actions based on the external environment of the vehicle and the vehicle status data using a model; and a perceived passenger comfort level for the performed vehicle action;
    in response to determining that a response urgency does not indicate a heightened sensitivity, selecting a vehicle action from the plurality of proposed vehicle actions based on the determined respective comfort level,
    wherein the response urgency indicates an urgency for the vehicle in the external environment to perform the vehicle action, and wherein selecting the vehicle action is an estimate of which of the proposed vehicle actions satisfies the comfort level when the response urgency does not indicate the heightened sensitivity;
    in response to determining that the response urgency indicates the heightened sensitivity, selecting the vehicle action by bypassing the respective comfort level; and
    causing the vehicle to perform the selected vehicle action.

2. The method of claim 1, wherein the selected vehicle action is selected based further on a ride preference of a passenger of the vehicle.

3. The method of claim 2, wherein the ride preference is generated using a model for inferring a ride preference based on an identity of the passenger of the vehicle, wherein the model is trained using records of performed vehicle actions.

4. The method of claim 1, wherein the model is a machine learning model that is trained using records of performed vehicle actions, wherein each of the records for each performed vehicle action comprises external environment data, vehicle status data, and a perceived passenger comfort level for the performed vehicle action.

5. The method of claim 1, further comprising:
    after the selected vehicle action has been performed by the vehicle, receiving an indication of a perceived comfort level for the selected vehicle action from a passenger of the vehicle.

6. The method of claim 1, wherein records of performed vehicle actions comprise vehicle actions performed by autonomous vehicles, non-autonomous vehicles, or simulated vehicles.

7. The method of claim 4, wherein the external environment data for a performed vehicle action in records for the performed vehicle actions comprises:
    data collected by an external environmental sensor associated with a vehicle that performed the vehicle action at a time associated with the vehicle action;
    a representation of the external environment of the vehicle that performed the vehicle action at the time associated with the vehicle action; or
    communication data transmitted or received by a communication module of the vehicle that performed the vehicle action or by a vehicle management system at the time associated with the vehicle action.

8. The method of claim 1, wherein the vehicle status data comprises:
    a kinematic property of a vehicle; an occupancy of a vehicle; or a communication status of a vehicle.

9. The method of claim 1, wherein the model for predicting comfort levels of proposed vehicle actions is retrained by: comparing the determined respective comfort level for one or more of the vehicle actions to a perceived comfort level of records of the vehicle action.

10. The method of claim 1, wherein selecting the vehicle action from the plurality of proposed vehicle actions based on the determined respective comfort level comprises:
identifying an expected comfort level of a passenger of the vehicle; and
comparing the determined respective comfort level of each proposed vehicle action of the plurality of proposed vehicle actions to the expected comfort level.

11. A system comprising: one or more processors of a computing system of a vehicle and one or more computer-readable non-transitory storage media in communication with the one or more processors, the one or more computer readable non-transitory storage media comprising instructions that, when executed by the one or more processors, are configured to cause the system to perform operations comprising:
determining an external environment of the vehicle based on data received from external environmental sensors of the vehicle;
generating, a plurality of proposed vehicle actions associated with vehicle status data;
determining a respective comfort level for each proposed vehicle action of the plurality of proposed vehicle actions based on the external environment of the vehicle and the vehicle status data using a model;
in response to determining that a response urgency does not indicate a heightened sensitivity, selecting a vehicle action from the plurality of proposed vehicle actions based on the determined respective comfort level,
wherein the response urgency indicates an urgency for the vehicle in the external environment to perform the vehicle action, and wherein selecting the vehicle action is an estimate of which of the proposed vehicle actions satisfies the comfort level when the response urgency does not indicate the heightened sensitivity;
in response to determining that the response urgency indicates the heightened sensitivity, selecting the vehicle action by bypassing the respective comfort level; and
causing the vehicle to perform the selected vehicle action.

12. The system of claim 11, wherein the selected vehicle action is selected based further on a ride preference of a passenger of the vehicle.

13. The system of claim 12, wherein the ride preference is generated using a model for inferring a ride preference based on an identity of the passenger of the vehicle, wherein the model is trained using records of performed vehicle actions.

14. The system of claim 11, wherein the model is a machine learning model that is trained using records of performed vehicle actions, wherein each of the records for each performed vehicle action comprises external environment data, vehicle status data, and a perceived passenger comfort level for the performed vehicle action.

15. The system of claim 11, wherein the instructions are further configured, when executed by the one or more processors, to cause the system to perform further operations comprising:

after the selected vehicle action has been performed by the vehicle, receiving an indication of a perceived comfort level for the selected vehicle action from a passenger of the vehicle.

16. One or more computer-readable non-transitory storage media including instructions that, when executed by one or more processors of a computing system of a vehicle, are configured to cause the one or more processors to perform operations comprising:
determining an external environment of the vehicle based on data received from external environmental sensors of the vehicle;
generating a plurality of proposed vehicle actions associated with vehicle status data;
determining a respective comfort level for each proposed vehicle action of the plurality of the proposed vehicle actions based on the external environment of the vehicle and the vehicle status data using a model;
in response to determining that a response urgency does not indicate a heightened sensitivity, selecting a vehicle action from the plurality of proposed vehicle actions based on the determined respective comfort level, wherein the response urgency indicates an urgency for the vehicle in the external environment to perform the vehicle action, and wherein selecting the vehicle action is an estimate of which of the proposed vehicle actions satisfies the comfort level when the response urgency does not indicate the heightened sensitivity;
in response to determining that the response urgency indicates the heightened sensitivity, selecting the vehicle action by bypassing the respective comfort level; and
causing the vehicle to perform the selected vehicle action.

17. The one or more computer-readable non-transitory storage media of claim 16, wherein the selected vehicle action is selected based further on a ride preference of a passenger of the vehicle.

18. The one or more computer-readable non-transitory storage media of claim 17, wherein the ride preference is generated using a model for inferring a ride preference based on an identity of the passenger of the vehicle, wherein the model is trained using records of performed vehicle actions.

19. The one or more computer-readable non-transitory storage media of claim 16, wherein the model is a machine learning model that is trained using records of performed vehicle actions, wherein each of the records for each performed vehicle action comprises external environment data, vehicle status data, and a perceived passenger comfort level for the performed vehicle action.

20. The one or more computer-readable non-transitory storage media of claim 16, wherein the instructions are further configured to cause the one or more processors to perform operations further comprising:
after the selected vehicle action has been performed by the vehicle, receiving an indication of a perceived comfort level for the selected vehicle action from a passenger of the vehicle.

* * * * *